(12) United States Patent
Morooka

(10) Patent No.: US 6,333,824 B1
(45) Date of Patent: Dec. 25, 2001

(54) ZOOM LENS SYSTEM CONSISTING OF TWO LENS UNITS

(75) Inventor: Masaru Morooka, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/392,636

(22) Filed: Sep. 9, 1999

(30) Foreign Application Priority Data

Sep. 10, 1998 (JP) .................................................. 10-256153
Oct. 16, 1998 (JP) .................................................. 10-294848

(51) Int. Cl.$^7$ .................................................. G02B 15/14
(52) U.S. Cl. .................................................. 359/692; 359/717
(58) Field of Search .................................. 359/692, 691, 359/717

(56) References Cited

U.S. PATENT DOCUMENTS

| | | | |
|---|---|---|---|
| 4,936,661 | * 6/1990 | Betensky et al. | 359/692 |
| 5,434,712 | * 7/1995 | Ito | 359/692 |
| 5,541,772 | * 7/1996 | Lin | 359/692 |
| 5,633,760 | * 5/1997 | Shibayama | 359/692 |
| 5,663,838 | * 9/1997 | Hasushita et al. | 359/692 |
| 5,684,638 | 11/1997 | Kamo et al. | 359/692 |
| 5,687,028 | 11/1997 | Ito | 359/692 |
| 5,757,556 | * 5/1998 | Nishimura | 359/692 |
| 5,777,800 | 7/1998 | Yamaguchi et al. | 359/692 |
| 5,786,945 | * 7/1998 | Aoki et al. | 359/692 |
| 5,790,318 | * 8/1998 | Sato | 359/692 |
| 5,796,527 | 8/1998 | Ohtake | 359/692 |
| 5,808,812 | 9/1998 | Kamo | 359/692 |
| 5,864,435 | * 1/1999 | Toyama | 359/692 |

FOREIGN PATENT DOCUMENTS

| | | | | |
|---|---|---|---|---|
| 054113537 A | * | 5/1993 | (JP) | 359/692 |
| 05249375 A | * | 9/1993 | (JP) | 359/692 |
| 05281472 A | * | 10/1993 | (JP) | 359/692 |
| 06109973 A | * | 4/1994 | (JP) | 359/692 |
| 6-130298 | | 5/1994 | (JP) . | |
| 6-347696 | | 12/1994 | (JP) . | |
| 7-261078 | | 10/1995 | (JP) . | |
| 8-248313 | | 9/1996 | (JP) . | |
| 8-304701 | | 11/1996 | (JP) . | |
| 9-5627 | | 1/1997 | (JP) . | |
| 9-90220 | | 4/1997 | (JP) . | |
| 9-96761 | | 4/1997 | (JP) . | |
| 9-152549 | | 6/1997 | (JP) . | |
| 9-166749 | | 6/1997 | (JP) . | |
| 10-104516 | | 4/1998 | (JP) . | |
| 10-104517 | | 4/1998 | (JP) . | |

* cited by examiner

*Primary Examiner*—Georgia Epps
*Assistant Examiner*—Evelyn A. Lester
(74) *Attorney, Agent, or Firm*—Pillsbury Winthrop LLP

(57) ABSTRACT

A zoom lens system for compact cameras comprising, in order from the object side, a first negative lens unit and a second positive lens unit, and configured to be zoomed from a wide position to a teleposition by moving the lens units toward the object side while narrowing the airspace reserved between the two lens units; the first lens unit comprising a first negative subunit and a second positive subunit, the first subunit comprising a biconcave lens component having a radius of curvature on the image side smaller than that on the object side, and a negative meniscus lens component having a convex surface on the object side, the second lens unit comprising, in order from the object side, a positive lens component and a negative lens component.

31 Claims, 9 Drawing Sheets

ZOOM LENS SYSTEM CONSISTING OF TWO LENS UNITS

BACKGROUND OF THE INVENTION

1. Field of the Invention

The present invention relates to a zoom lens system consisting of two lens units and which is to be used to pick up an image, for example a zoom lens consisting of two lens units which is to be used in lens shutter cameras.

2. Description of the Prior Art

In recent years, zoom lens systems have been generally used in lens shutter cameras and there has been demand in particular for inexpensive compact cameras. Speaking concretely, optical designs are carried out to permit one to compose lens systems of fewer lens elements and using inexpensive materials. To reduce thicknesses of camera bodies a main stream of lens systems are formed by the so-called collapsible mount type lens systems which are accommodated in camera bodies where airspaces between adjacent lens units, which are moved to change a magnification of the lens system, are narrowed. In order to further reduce thicknesses of camera bodies, it is necessary to shorten the total length of each lens unit, which are moved on an optical axis to change the magnification of the lens system.

There have been proposed a lot of such zoom lens systems, each having a simple composition consisting of two positive and negative lens units. Such zoom lens systems have been disclosed, for example, by Japanese Patents Kokai Publication No. Hei 6-347696, No. Hei 8-248313, No. Hei 990220, No. Hei 9-96761, No. Hei 9-166749, No. Hei 10-104516 and No. Hei 10-104517.

The zoom lens systems disclosed by these patents use aspherical lens elements to reduce the numbers of lens elements to be used, thereby making the lens systems compact. Furthermore, the aspherical lens elements are made of plastic materials to lower manufacturing costs of the zoom lens systems.

However, the zoom lens systems disclosed by Japanese Patents Kokai Publication No. Hei 6-347696, No. Hei 8-248313, No. Hei 9-00220, No. Hei 10-104516 and No. Hei 10-104517 do not correct chromatic aberration sufficiently, thereby allowing chromatic aberration to be varied remarkably by changing magnifications, and are incapable of exhibiting favorable optical performance over entire zooming ranges.

Furthermore, the zoom lens systems disclosed by Japanese Patents Kokai Publication No. Hei 9-90220 and No. Hei 9-96761 have field angles on the order of 56°, which are not sufficiently wide at wide positions even though these zoom lens systems have vari-focal ratios of 2 or higher. Moreover, the zoom lens system disclosed by Japanese Patent Kokai Publication No. Hei-96761 does not correct coma sufficiently at the wide position, thereby being incapable of exhibiting favorable optical performance.

Each of the zoom lens systems disclosed by the prior art uses a plastic lens element having a weak refractive power in a positive lens unit, but adopts a plastic lens element having a certain degree of refractive power in a negative lens unit which has refractive index and surface shape changes due to temperature and humidity variations, thereby posing a problem to change a refractive power of the lens system, and aberrations in the lens system.

Furthermore, vari-focal ratios exceeding 2 are desired for zoom lens systems for lens shutter cameras. Since it is desired that a photographic lens system be compact and light in weight even when it has a high vari-focal ratio, it is attempted to shorten the diameter of the lens system and narrow the airspace between lens units adjacent to each other so that the total length of the lens system is accommodated in the camera body in the so-called collapsed condition. Shortening the total length of the lens system in the collapsed condition constitutes a theme important for development of a lens system. For compact configuration of a zoom lens system, it is general to use an aspherical lens element to reduce the number of lens elements to be used in the lens system.

A zoom lens system disclosed by Japanese Patent Kokai Publication No. Hei 8-304701, for example, is known as a zoom lens system which uses an aspherical lens element to reduce the number of lens elements used therein, and has a zooming vari-focal ratio of 2.5 or higher.

Furthermore, it is practised to use plastic materials for aspherical lens elements so that the aspherical elements can be manufactured at low costs and have light weights. Zoom lens systems disclosed by Japanese Patents Kokai Publication No. Hei 6-130298, No. 7-261078, No. Hei 9-152549 and No. Hei 9-5627, for example, are known as zoom lens systems which are configured compactly and are light in weight; using aspherical lens elements, and having vari-focal ratios of 2 or higher.

When an aspherical lens element is made of a plastic material, however, there is posed a problem that the shape and the refractive index of the plastic lens element are changed due to temperature and humidity variations. Speaking more concretely, the focal length of the plastic lens element is changed due to environmental variations, thereby distorting a focus surface of a lens system. This problem is more noticeable with a plastic lens element that has a stronger refractive power; and plastic lens elements are used in a larger number.

The zoom lens systems disclosed by Japanese Patent Kokai Publication No. Hei 6-130298 and No. Hei 9-5627 are configured to reduce influences on the plastic lens elements due to temperature and humidity variations by imparting weak refractive powers to the plastic lens elements, but allow focus surfaces to be remarkably varied at telepositions, and cannot completely prevent the influences due to the temperature and humidity variations. Furthermore, each of the zoom lens systems uses a plurality of plastic lens elements, and is liable to be influenced by the temperature and humidity variations.

The zoom lens system disclosed by Japanese Patent Kokai Publication No. Hei 7-261078 uses a plastic lens element that has a strong refractive power, thereby being liable to be influenced due to temperature and humidity variations. Furthermore, lens units which are moved to change a magnification of the lens system have relatively long total lengths on an optical axis, thereby enlarging the thickness of the camera body in a collapsed condition of the zoom lens system.

The zoom lens system disclosed by Japanese Patent Kokai Publication No. Hei 9-152549 adopts a plastic lens element which has a weak refractive power in order to reduce the influences on the plastic lens element due to the temperature and humidity variations, but allows the focus surface to be remarkably varied at the teleposition, and cannot completely prevent the influences due to the temperature and humidity variations. Furthermore, lens units which are moved to change a magnification of the lens system have a relatively long total length on an optical axis, thereby enlarging the thickness of the camera body in an collapsed condition of the zoom lens system.

On the other hand, the zoom lens system disclosed by Japanese Patent Kokai Publication No. Hei 8-304701, which is to have the zooming vari-focal ratio exceeding 2.5, uses lens units composed of a large number of lens elements, and has a large total length on an optical axis, thereby enlarging the thickness of the camera body in a collapsed condition of the lens system.

SUMMARY OF THE INVENTION

A primary object of the present invention is to provide a zoom lens system which has a zoom ratio on the order of 2 or higher, a field angle of 60° or larger at a wide position, aberrations favorably corrected over an entire zooming range, and a short total length in a collapsed condition. The present invention also provides a zoom lens system which is configured so as to be manufactured at a low cost using plastic lens components, and have optical performance not degraded due to variations of environmental conditions such as temperature and humidity.

The zoom lens system according to the present invention consists, in order from the object side, of a first lens unit having a positive refractive power, and a second lens unit having a negative refractive power, and is configured to change the magnification from a wide position to a teleposition by moving the two lens units toward the object side so as to narrow the airspace reserved between the first lens unit and the second lens unit: the first lens unit consisting, in order from the object side, of a first negative subunit and a second positive subunit, the first negative subunit comprising, in order from the object side, a biconcave lens component which has a radius of curvature on an image side smaller than that on the object side, and a negative meniscus lens component which has a convex surface on the object side; the second subunit consisting, in order from the object side, of a positive lens component and a negative lens component, and the second lens unit comprising, in order from the object side, a positive lens component and a negative lens component; and the zoom lens system satisfies the following conditions (1), (2) and (3):

$$0.2 < |f_{G11}/D| < 1.8 \tag{1}$$

$$v_{L4} < 50 \tag{2}$$

$$50 < v_{L5} < 70 \tag{3}$$

The zoom lens system according to the present invention, which has another composition, consisting, in order from the object side, a first lens unit having a positive refractive power and a second lens unit having a negative refractive power, configured to change a magnification from a wide position to a teleposition by moving the two lens units toward the object side so as to narrow the airspace reserved between the first lens unit and the second lens unit, that the first lens unit consists, in order from the object side, of a first subunit which comprises a negative lens component having a radius of curvature on the image side smaller than that on the object side, the second subunit which comprises at least a positive lens component and a negative lens component, and that the lens system satisfies the following conditions (5) and (6)

$$0.2 < |f_{1N}/D| < 2.1 \tag{5}$$

$$5 < v_d(R) - v_d(F) < 20 \tag{6}$$

DESCRIPTION OF THE PREFERRED EMBODIMENTS

Figure 1:
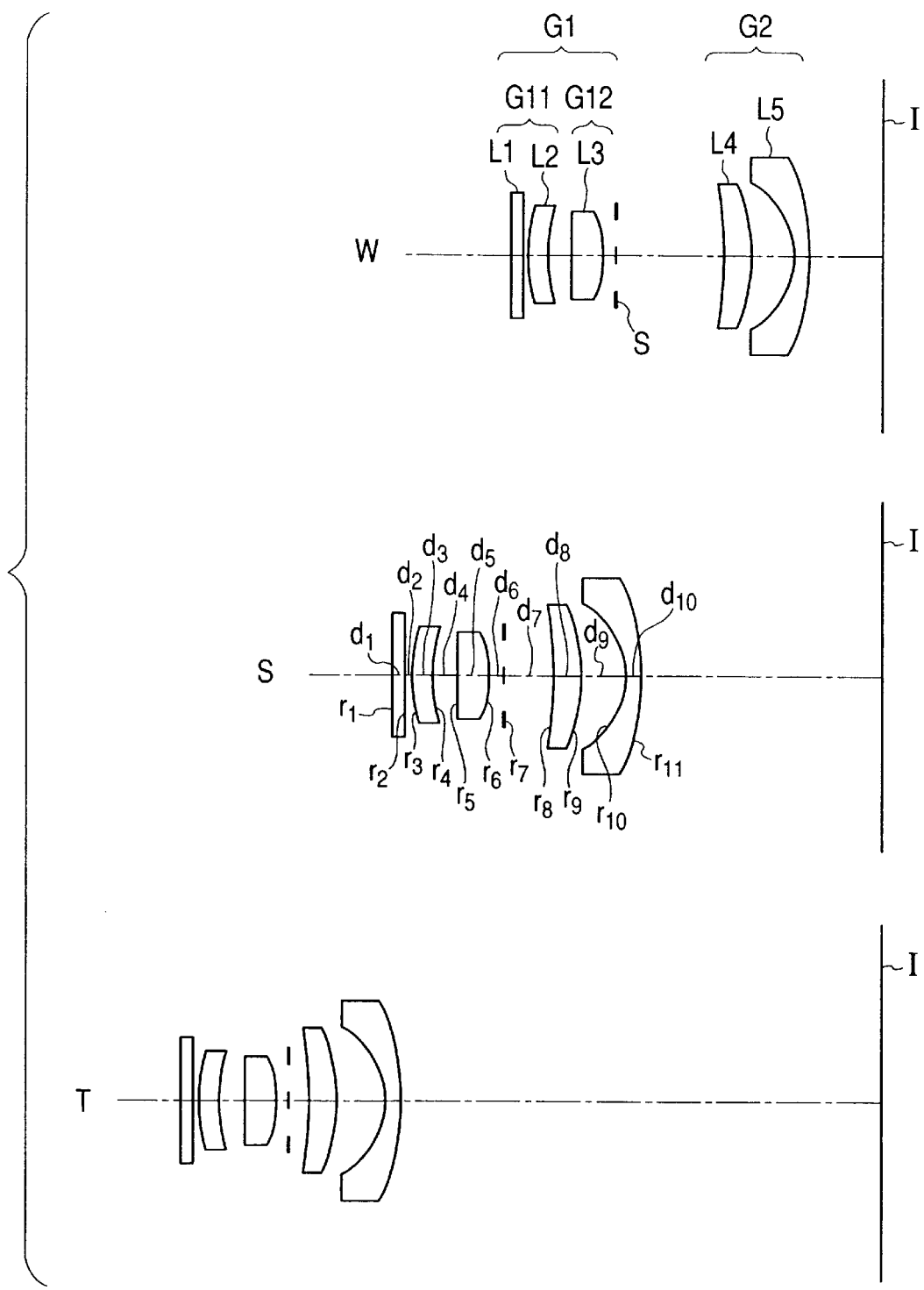
FIGS. 1 through 8 show sectional views illustrating compositions of first through eighth embodiments, respectively, of the zoom lens system according to the present invention.

A first composition of the zoom lens system according to the present invention consists, in order from the object side, for example as shown in FIG. 1, of a first lens unit G1 having a positive refractive power and a second lens unit G2 having a negative refractive power, and is configured to change a magnification from a wide position to a teleposition by moving the lens units toward the object side so as to narrow the airspace reserved between the first lens unit G1 and the second lens unit G2; that the first lens unit G1 comprises, in order from the object side, a first negative subunit G11 and a second positive subunit G12, that the first negative subunit G11 comprises a biconcave lens component L1 which has a radius of curvature on the image side smaller than that on the object side, and a negative meniscus lens component L2 which has a convex surface on the object side, that the second positive subunit G12 comprises a positive lens component L3, that the second lens unit comprises, in order from the object side, a positive lens component L4 and a negative lens component L5, and that the zoom lens system satisfies the following conditions (1), (2) and (3)

$$0.2 < |f_{G11}/D| < 1.8 \tag{1}$$

$$v_{L4} < 50 \tag{2}$$

$$50 < v_{L5} < 70 \tag{3}$$

wherein the reference symbol $f_{G11}$ represents a focal length of the first negative subunit G11 of the first lens unit G1, the reference symbol D designates a diagonal length of an image surface, the reference symbol $v_{L4}$ denotes an Abbe's number of the positive lens component L4 of the second lens unit G2, and the reference symbol $v_{L5}$ represents an Abbe's number of the negative lens component L5 of the second lens unit G2.

The zoom lens system according to the present invention, which has the first composition, uses the first lens unit G1, which is configured as a retrofocus type, and is composed, in order from the object side, of the first subunit G11 having a negative refractive power, and the second subunit G12 having a positive refractive power, and allows a principal point of the first lens unit G1 to displace toward an image surface, thereby being capable of reserving a sufficient back focal length at a wide position and favorably correcting positive distortion.

The first subunit G11 of the first lens unit G1 is composed, in order from the object side, of the negative lens component, L11, which has a radius of curvature on the image side smaller than that on the object side, and the negative meniscus lens component, L2, which has the convex surface on the object side for the reason described below:

In the first lens unit, G1, of the zoom lens system according to the present invention, which is composed of the first negative subunit G11 and the second positive subunit G12, the second subunit G12 has a refractive power which is relatively strong since the first lens unit G1 has a positive refractive power as a whole. Accordingly, the second positive subunit G12 produces negative spherical aberration, astigmatism, and positive coma in large amounts. A lens system which is configured to have a vari-focal ratio of 2 or higher, like the zoom lens system according to the present invention, produces astigmatism in a large amount within a range from a wide position to an intermediate focal length, thereby remarkably exhibiting low imaging performance at marginal portions of an image. The low imaging performance is more problematic when a field angle is widened at the wide position or when a refractive power of each lens unit is strengthened.

To cancel aberrations which are produced by the second positive subunit G12 of the first lens unit G1, the meniscus lens component L2, which has the convex surface on the object side, is disposed in the first negative subunit G11 of the first lens unit G1 so that it produces positive spherical aberration, astigmatism, and negative coma in large amounts; thereby cancelling aberrations produced by the second positive subunit G12, and reducing amounts of aberrations produced in the first lens unit G1 as a whole.

When the zoom lens system is configured to cancel the aberrations produced by the second positive subunit G12 of the first lens unit G1 with the meniscus lens component L2 of the first negative subunit G11, the zoom lens system has optical performance which is largely dependent on an eccentricity of the meniscus lens component, disposed in the first negative subunit G11, relative to the second positive subunit G12. For this reason, the negative lens component L1 is disposed on the object side of the meniscus lens component L2, where a height of an off-axial ray is larger than that on the meniscus lens component L2, producing positive astigmatism in particular, the dependency of the optical performance of the zoom lens system on the eccentricity of the meniscus lens component L2 relative to the second positive subunit G12 is lowered.

Since the negative lens component has a radius of curvature on the image side which is smaller than that on the object side, it can reduce the amount of negative distortion to be produced in the first lens unit G1, thereby providing an advantage to correct distortion in the zoom lens system as a whole. Furthermore, since the negative lens component L1 has a concave surface on the object side, it can further reduce the amount of negative distortion to be produced.

Furthermore, by imparting a negative refractive power to the meniscus lens component L2 that has a convex surface on the object side, it is possible to displace the principal point of the second negative subunit G12 toward the object side, thereby shortening the total length of the zoom lens system.

When the first negative subunit G11 of the first lens unit G1 is composed of negative lens component L1, which has a radius of curvature on the image side smaller than that on the object side, and the negative meniscus lens component L2 which has a convex surface on the object side as in the first composition of the zoom lens system according to the present invention, the zoom lens system can exhibit favorable optical performance shortening its total length while maintaining a zoom ration on the order of 2 or higher and a field angle of 60° or larger at the wide position.

In the first composition according to the present invention wherein the second lens unit G2 is composed, in order from the object side, of the positive lens component L4 and the negative lens component, L5, each consisting of a single lens element, the second lens unit G2 has a small Petzval's sum and can therefore correct chromatic aberration favorably.

The condition (1) is required to configure compactly an optical instrument which uses the zoom lens system according to the present invention and defines a focal length of the first subunit G11 to be disposed in the first lens unit.

When the refractive power of the first negative subunit G11 is strengthened without changing the refractive power of the first lens unit G1, the refractive power of the second positive subunit G12 is also strengthened, thereby shortening a distance between the principal points of the first negative subunit G11 and the second positive subunit G12, and making it possible to shorten the total length of the first lens unit G1 on the optical axis. Accordingly, the first lens unit G1 can have a back focal length sufficiently long to make it possible to dispose the second lens unit G2 at a location shifted toward the object side, and prolong the back focal length of the zoom lens system as a whole, with rays passing through an outermost portion of the second lens unit G2 lowered sufficiently to make it possible to shorten the diameter of the second lens unit G2. As a result, the total length of zoom lens system in its collapsed condition is shortened and a diameter of the lens barrel can be shortened to permit configuring compactly an optical instrument that uses the zoom lens system according to the present invention.

If $f_{G11}/D$ exceeds the lower limit of the condition (1), it will provide an advantage to configure an optical instrument compact, but the first lens unit G1 will produce negative spherical aberration and positive coma in large amounts, thereby making it difficult to obtain a favorable condition of aberrations in the zoom lens system as a whole. If $f_{G11}/D$ exceeds the upper limit of the condition (1), in contrast, it will provides a disadvantage to configure the optical instrument compactly.

The conditions (2) and (3) are required to correct chromatic aberration favorably in the zoom lens system as a whole, and define Abbe's numbers of the positive lens component L4 and the negative lens component L5, respectively, of the second lens unit G2.

When the second lens unit G2, which has the negative refractive power as a whole, is composed of the positive lens component L4 and the negative lens component L5, the negative lens component L5 has a relatively strong refractive power and produces positive lateral chromatic aberration in a large amount. Therefore, the condition (2) defines an Abbe's number of the positive lens component L4 of the second lens unit G2 so that the positive lens component produces negative lateral chromatic aberration in an adequate amount.

If the upper limit of the condition (2) is exceeded, the positive lens component L4 of the second lens unit G2 will produce negative chromatic aberration in a small mount, thereby making it difficult to correct the positive chromatic aberration adequately in the second lens unit G2.

Paying attention to the negative lens components disposed in the two lens units which are moved to change a magnification of the zoom lens system according to the present invention, both the lens unit produce longitudinal chromatic aberration in the same negative direction, whereas one of the lens units produces lateral chromatic aberration in such a direction that it is cancelled by lateral chromatic aberration produced by the other lens unit. The condition (3) defined the Abbe's number of the negative lens component L5 of the second lens unit G2 so that the lens units, which are moved to change a magnification of the lens system, produce lateral chromatic aberration in such adequate amounts as to correct lateral chromatic aberration favorably in the zoom lens system as a whole.

If the lower limit of the condition (3) is exceeded, lateral chromatic aberration will be overcorrected at the wide position and produced in a large amount within a range from an intermediate focal length to the teleposition, thereby making it impossible to balance chromatic aberration in the zoom lens system as a whole. If the upper limit of the condition (3) is exceeded, in contrast, it will be impossible to correct chromatic aberration at the wide position, thereby unbalancing chromatic aberration in the zoom lens system as a whole.

For the zoom lens system according to the present invention which has the first composition, it is desirable to use at least an aspherical surface as a surface of the negative meniscus lens component L2 which has the convex surface on the object side in the first subunit G11. When the first subunit G11 uses the aspherical surface as described above, it is capable of producing aberrations in amount adequate to effectively cancel aberrations produced by the second subunit G12.

When the aspherical surface is to be used as the surface of the negative meniscus lens component L2 of the first subunit G11 in the zoom lens system according to the present invention which has the first composition, it is preferable to make the negative meniscus lens component L2 of a plastic material.

It is preferable for lowering the manufacturing cost to configure an aspherical lens component not as an expensive molded glass lens component but as a molded plastic lens component.

When curvature is enhanced on a surface of the negative meniscus lens component configured as the plastic lens component it is positively enhanced due to temperature and humidity variations; curvature on the other surface of the lens component is negatively enhanced, whereby the negative meniscus lens component which is configured as the plastic lens component is capable of reducing variations of the refractive index and aberrations by mutual cancellation.

For the zoom lens system according to the present invention, which has the first composition, it is desirable to use at least an aspherical surface as a surface of the positive lens component L4 disposed in the second lens unit G2.

When refractive powers of the lens units are strengthened to shorten a total length of the zoom lens system as a whole, a negative refractive power is relatively strong in the second lens unit G2 since the second lens unit G2 has the negative refractive power. Accordingly, the second lens unit poses a problem that the negative lens component disposed therein produces positive spherical aberration in a large amount at the teleposition in particular.

When at least an aspherical surface is disposed as a surface of the positive lens component L4, the aspherical surface allows the positive lens component L4 to effectively produce negative spherical aberration, thereby cancelling the positive spherical aberration produced by the negative lens component L5.

As understood from the foregoing description, the zoom lens system according to the present invention, which has the first composition, is characterized also by using an aspherical lens component having at least an aspherical surface as the negative meniscus lens component L2, which has the convex surface on the object side in the first subunit G11; as the positive lens component L4 disposed in the second lens unit G2 or as each of the lens components L2 and L4.

It is preferable to make the lens components L2 and L4 of a plastic material when the lens components L2 and L4 are configured as the aspherical lens components, and it is desirable in particular to make the lens component L2 of a plastic material when it is configured as the aspherical lens component.

Such an aspherical lens component serves to manufacture the zoom lens system at a low cost. Since the second lens unit G2 has an advantage to allow a small deviation of an image at the teleposition, which is apt to have a small deviation of an image at the teleposition, and which is apt to be influenced by the environmental variations, it is desirable to use in the second lens unit.

The zoom lens system according to the present invention, which has a second composition, consists, in order from the object side, of a first lens unit G1 having a positive refractive power, and a second lens unit G2 having a negative refractive power, and is configured to change the magnification from the wide position to the teleposition by moving the lens units toward the object side so as to narrow the airspace reserved between the first lens unit G1 and the second lens unit G2; that the first lens unit G1 comprises, in order from the object side, a first negative subunit G11 and a second positive subunit G12, that the first negative subunit G11 comprises a biconcave lens component L1 having a radius of curvature on the image side which is smaller than that on the object side, and a negative meniscus lens component L2, which has at least an aspherical surface and is made of a plastic material, that the second positive subunit G12 comprises a positive lens component L3, and that the second positive subunit comprises, in order from the object side, a positive lens component L4 which has at least an aspherical surface and is made of a plastic material, and a negative lens component L5, and that the zoom lens system satisfies the above-mentioned conditions (1) and (3).

Since the zoom lens system according to the present invention which has the second composition uses, like the zoom lens system according to the present invention which has the first embodiment, the first lens unit G1 which is configured as a retrofocus type consisting of the first subunit G11 having a negative refractive power and the second subunit G12 having a positive refractive power, the zoom lens system which has the second composition is capable of displacing a principal point of the first lens unit G1 toward an image surface, reserving a sufficient back focal length at a wide position and favorably correcting positive distortion.

Since the first negative subunit G11 of the first lens unit G1 comprises, in order from the object side, the negative lens component L1 having the radius of curvature on the image side which is smaller than that on the object side, and the negative meniscus lens component L2 having the convex surface on the object side as in the first composition, the zoom lens system which has the second composition exhibits functional effects similar to those of the zoom lens system which has the first composition, and favorable optical performance even when its total length is shortened, while maintaining a zoom vari-focal ratio on the order of 2 or higher and a field angle of 60° at the wide position.

Furthermore, since the second lens unit G2 comprises, in order from the object side, the positive lens component L4 and the negative lens component L5, each composed of a single lens element as in the first composition, the second lens unit G2 has a small Petzvall's sum and can favorably correct chromatic aberration.

Furthermore, the zoom lens system according to the present invention which has the second composition satisfies the conditions (1) and (3) like the zoom lens system which has the first composition, thereby exhibiting functional effects similar to those of the zoom lens system which has the first composition, enabling compact configuration of an optical instrument which uses the zoom lens system, and correcting chromatic aberration favorably in the zoom lens system as a whole.

Since the zoom lens system according to the present invention which has the second composition also uses at least an aspherical surface on each of the negative meniscus lens components L2 of the first lens unit G1 and the positive lens component L4 of the second lens unit G2, the zoom lens system which has the second composition is capable of exhibiting similar functional effects and correcting aberrations favorably in the zoom lens system as a whole.

The lens components which use the aspherical surfaces are made of a plastic material so that they are more effective than expensive aspherical molded glass lens components thus lowering the manufacturing cost of the zoom lens system.

Since the negative lens component of the first lens unit and the positive lens component of the second lens unit are made of plastic material, these lens components are liable to be influenced due to variations of temperature and the like, thereby cancelling with each other the deviation of an image surface. Furthermore, the meniscus lens component L1 is configured as a plastic lens component and is capable of reducing variations of the refractive index and aberrations by mutual cancellation since curvature is positively enhanced on a surface of the lens component when curvature is negatively enhanced on the other surface of the lens component due to temperature and humidity variations.

When an aspherical lens component that is made of a plastic material as described above is to be used in the zoom lens system according to the present invention which has the first or second composition, it is desirable to satisfy the following condition (4):

$$3.0 < |f_P|/D \tag{4}$$

wherein the reference symbol $f_p$ represents the focal length of the lens component made of the plastic material, and the reference symbol D designates a diagonal length of an image surface.

The condition (4) is required to reduce the variations of the refractive index of the plastic lens component and aberrations due to environmental variations, and defines a focal length of the plastic lens component.

When a plastic material is used for an aspherical lens component, the refractive index and the surface shape of the aspherical lens component may be changed due to variations of temperature and the like, thereby posing problems of variation of the location of an image surface and aberrations. To prevent these variations, it is necessary to impart a relatively weak refractive power to the plastic lens component so as to reduce the changes of the refractive index and the surface shape due to the variations of temperature and humidity. A relatively weak refractive power which satisfies the condition (4) makes it possible to suppress the influences on the plastic lens component due to the variations of temperature and humidity.

It is more preferable to satisfy, in place of the condition (1), the following condition (1-1):

$$0.5 < |f_{G11}/D| < 1.8 \tag{1-1}$$

Furthermore, it is more preferable to satisfy, in place of the condition (4), the following condition (4-1):

$$5.5 < |f_p|/D \tag{4-1}$$

Figure 5:
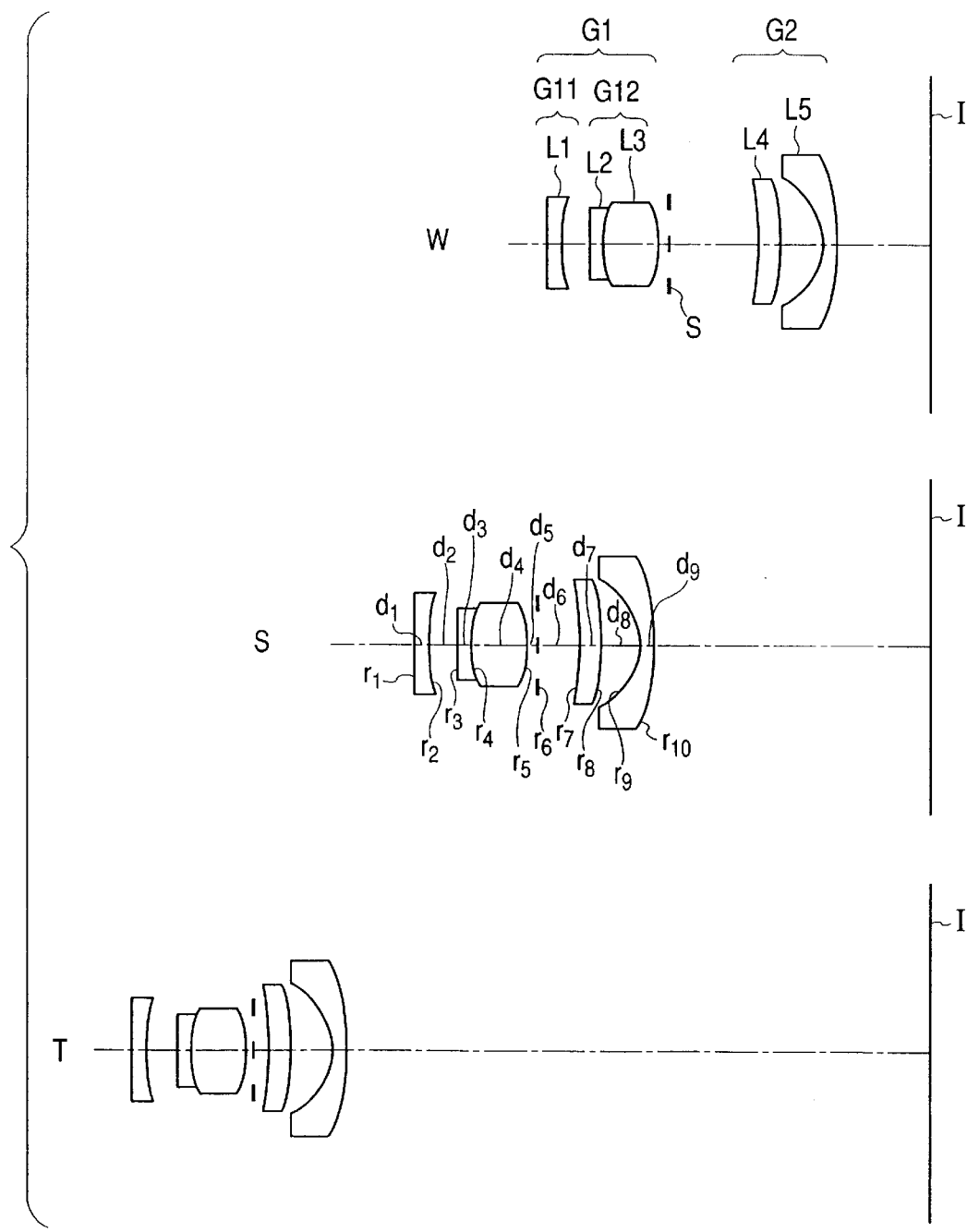

The zoom lens system according to the present invention which has a third composition, consists, in order from the object side as shown in FIG. 5 for example, of a first lens unit G1 having a positive refractive power and a second lens unit G2 having a negative refractive power, and is configured to change a magnification from a wide position to a teleposition by moving the lens units so as to narrow the airspace reserved between the first lens unit G1 and the second lens subunit G2, that the first lens unit G1 consists, in order from the object side, of a first negative subunit G11 and a second positive subunit G12, that the first subunit G11 disposed in the first lens unit G1 consists of a negative lens component having a radius of curvature on the image side which is smaller than that on the object side, that the second positive subunit G12 disposed in the first lens unit G1 consists of a negative lens component L2 and a positive lens component L3, that the second lens unit G2 comprises at least a positive lens component L4 and a negative lens component L5, and that the zoom lens system satisfies the following conditions (5) and (6):

$$0.2 < |f_{1N}/D| < 2.1 \tag{5}$$

$$5 < v_d(R) - v_d(F) < 20 \tag{6}$$

wherein the reference symbol $f_{1N}$ represents a focal length of the negative lens component disposed in the first lens unit G1, the reference symbol D designates a diagonal length of an image surface, the reference symbol $v_d(R)$ denotes an Abbe's number of the negative lens component disposed on the image side, and the reference symbol $v_d(F)$ represents an Abbe's number of the negative lens element disposed on the object side in the zoom lens system.

The zoom lens system according to the present invention, which has the third composition, wherein the first lens unit G1 is configured as a retrofocus type which is composed, in order from the object side, of the first subunit G11 which has a negative refractive power, and the second subunit G12 which has the positive refractive power, for example as shown in FIG. 5; and is capable of displacing a principal point of the first lens unit G1 toward an image side, reserving a sufficient back focal length at the wide position, and favorably correcting positive distortion.

Taking into consideration a fact that chromatic aberration cannot be corrected independently in the first negative subunit G11 when the first negative subunit of the first lens unit G1 is composed only of the negative lens component L1, the second positive subunit of the first lens unit G1 is composed of the negative lens component L2 and the positive lens component L3 so that the second subunit having this composition can correct chromatic aberration favorable in the first lens unit G1. Similarly, chromatic aberration can be corrected favorably in the second lens unit G2 by composing the second lens unit G2 of at least the positive lens component L4 and the negative lens component L5.

Description will be made of a reason why the first subunit G11 of the first lens unit G1 is composed of the negative lens component L1, having a radius of curvature on the object side which smaller than that on the image side. In case of a zoom lens system which is composed of two lens units like the zoom lens system according to the present invention, it is impossible to obtain a favorable aberration condition in the zoom lens system as a whole at different magnification levels unless aberrations are corrected favorably independently in each of the lens units. In the composition of the zoom lens system according to the present invention, in particular wherein the first lens unit G1 has the positive refractive power, the second positive subunit G12 has a relatively strong refractive power in the first lens unit G1. Accordingly, the second positive subunit G12 produces negative spherical aberration and positive coma in large amounts.

To favorably correct aberrations produced by the second subunit G12, the first subunit G11 to be disposed on the object side of the second subunit G12 is composed of the negative lens component having a radius curvature which is smaller than that on the object side. That is, the lens component which has an image side concave surface having higher curvature is disposed so that the surface produces positive spherical aberration and negative coma to cancel the negative spherical aberration and positive coma in the first lens unit G1.

The condition (9) is required to balance compact configuration with aberration correcting performance of the zoom lens system and defines a focal length of the negative lens component used in the first lens unit G1. The negative lens component used in the first lens unit G1 may be disposed in the second positive subunit G12 or the first negative subunit G11, and when a plurality of negative lens component are disposed in a lens unit, each of the lens component must satisfy the condition (5).

When a refractive power of the negative lens component disposed in the first lens unit G1 is strengthened so as to satisfy the condition (5), a refractive power of the second subunit G2 is also strengthened, resulting in strengthening of the refractive power of the negative lens components disposed in the first lens unit G1. Accordingly, a distance between principal points of the first negative subunit G11 and the second positive subunit G12 is shortened, thereby making it possible to configure the first lens unit G1 so as to have a short total length on the optical axis. Since such a short total length of the first lens unit G1 allows the first lens unit G1 to have a sufficient back focal length, it is possible to dispose the second lens unit G2 at a location shifted toward the object side and lengthen a back focal length of the zoom lens system as a whole. Furthermore, a ray which passes through an outermost portion of the second lens unit G2 is lowered, thereby making it possible to shorten the diameter of the second lens unit G2 and the diameter of the lens barrel.

When the condition (5) is satisfied, the zoom lens system can have a short total length on the optical axis in its collapsed condition and the lens barrel can have a short diameter as described above, thereby making it possible to configure compactly an optical instrument which uses the zoom lens system according to the present invention.

If the lower limit of the condition (5) is exceeded, an advantage for compact configuration of the zoom lens system will be obtained, but large amounts of negative spherical aberration and positive coma will be produced in the first lens unit G1, thereby making it difficult to obtain a favorable aberration condition in the zoom lens system as a whole. If the upper limit of the condition (5) is exceeded, in contrast, it will be difficult to configure compact the optical instrument that uses the zoom lens system according to the present invention.

The condition (6) is required to correct lateral chromatic aberration favorably in the zoom lens system as a whole.

Paying attention to the negative lens components disposed in the first and second lens units G1 and G2, longitudinal chromatic aberration is produced by the lens units in the same negative direction, whereas one of the lens units produces lateral chromatic aberration in a direction to cancel lateral chromatic aberration produced by the other lens unit. The condition (6) therefore defines an Abbe's number of the negative lens component disposed at an outermost location.

If the lower limit of the condition (6) is exceeded, lateral chromatic aberration will be overcorrected at the wide position and produced in a large amount at the teleposition, whereby chromatic aberration will be unbalanced in the zoom lens system as a whole. If the upper limit of the condition (6) is exceeded, in contrast, lateral chromatic aberration will be overcorrected at the teleposition and produced in a large amount at the wide position, whereby chromatic aberration will be unbalanced in the zoom lens system as a whole.

Furthermore, the zoom lens system according to the present invention that has the third composition is characterized so that all the lens components are made of a glass material. In the zoom lens system according to the present invention that has the third composition, the lens units are composed of lens components having relatively strong refractive powers. It is therefore desirable to make all the lens components of the glass material so that the lens components are free from influences due to variations of temperature and humidity.

For the zoom lens system according to the present invention which has the third composition, it is desirable to configure the second positive subunit to be disposed in the first lens unit G1 as a cemented lens component.

For the zoom lens system according to the present invention which is to be configured compactly while maintaining a high vari-focal ratio, the lens units must have strong refractive powers, whereby the negative lens unit has a relatively strong refractive power in the second negative lens unit G2. Accordingly, this negative lens component produces positive lateral chromatic aberration in a large amount, but positive lateral chromatic aberration to be produced in the first lens unit G1 can be reduced by configuring the second positive subunit G2 as a cemented lens component consisting of the negative lens element L2 and the positive lens element L3, thereby reducing positive lateral chromatic aberration in the zoom lens system as a whole.

The zoom lens system according to the present invention, which has a fourth composition, consists, in order from the object side, of a first lens unit G1 having a positive refractive power and a second lens unit G2 having a negative refractive power, and is configured to change a magnification from a wide position to a tele position by moving the lens units toward the object side so as to narrow an airspace reserved between the first lens unit G1 and the second lens unit G2, that the first lens unit G1 comprises, in order from the object side, a first negative subunit G11 and a second positive subunit G2, that the first negative subunit G11 disposed in the first lens unit G1 consists of a negative lens L1, that the second positive subunit G12 disposed in the first lens unit G1 comprises at least a negative lens component L2 and a positive lens component L3, that the second lens unit G2 comprises at least a positive lens component L4 and a negative lens component L5, and that the zoom lens system satisfies the following conditions (5), (6) and (7):

$$0.2 < |f_{1N}/D| < 2.1 \tag{5}$$

$$-5 < v_d(R) - v_d(F) < 20 \tag{6}$$

$$-5.0 < (R_2 + R_1)/(R_2 - R_1) < -0.9 \tag{7}$$

wherein the reference symbol $f_{1N}$, represents a focal length of the negative lens component disposed in the first lens unit, the reference symbol D designates a diagonal length of an image surface, the reference symbol $v_d(R)$ denotes an Abbe's number of the negative lens component disposed on the image side, the reference symbol $v_d(F)$ represents an Abbe's number of the negative lens component disposed on the object side, the reference symbol $R_1$ designates a radius of curvature on an object side surface of the negative lens component L1 and the reference symbol $R_2$ denotes a radius of curvature on an image side surface of the negative lens component L1.

The zoom lens system according to the present invention, which has the fourth composition, wherein the first lens unit G1 is configured as a retrofocus type which consists, in order from the object side, of the first subunit G11 having a negative refractive power, and the second subunit G12 having a positive refractive power, as in the third composition, is capable of displacing a principal point of the first lens unit G1 toward an image surface, reserving a sufficient back focal length at a wide position and favorably correcting positive distortion.

Like the zoom lens system according to the present invention which has the third composition, the zoom lens system according to the present invention which has the fourth composition satisfies the condition (5) and (6), thereby making it possible to configure compact an optical instrument which uses the zoom lens system according to the present invention and correct aberrations favorably.

The condition (7) defines a shaping factor of the negative lens component L1 to be disposed in the first negative subunit G11 of the first lens unit G1, thereby defining a shape of the negative lens component L1. The condition (7) defines a radius of curvature on an image side surface of the negative lens component L1 which is smaller than that of the object side surface of the lens component so that the lens component L1 has a function to produce positive spherical aberration and negative coma in large amounts in the first negative subunit G11, thereby cancelling negative spherical aberration and positive coma produced by the second positive subunit G12.

If the upper limit of the condition (7) is exceeded, the first negative subunit G11 will produce positive spherical aberration and negative coma in small amounts, thereby being incapable of canceling the negative spherical aberration and the positive coma produced by the second positive subunit G12. If the lower limit of the condition (7) is exceeded, in contrast, the first negative subunit G11 will produce positive spherical aberration and negative coma in large amounts, whereby the positive spherical aberration and the negative coma will remain in the first lens unit G1.

From a viewpoint to correct chromatic aberration in the zoom lens system as a whole, the first negative subunit G1 of the first lens unit which is composed only of the negative lens component is incapable of correcting chromatic aberration in the first negative subunit G11 independently, but the second positive subunit G12 of the first lens unit G1, which is composed at least of the negative lens component and the positive lens component, is capable of correcting chromatic aberration favorably in the first lens unit G1 independently. Furthermore, the second lens unit G2, which is composed at least of the positive lens component L4 and the negative lens component L5, is capable of correcting chromatic aberration favorably in the second lens unit G2 independently.

For the zoom lens system according to the present invention that has the third or fourth composition described above, it is preferable to use at least an aspherical surface as a surface of the first negative subunit G11.

In order to make the zoom lens system so as to have a vari-focal ratio exceeding 2.5 and a short total length, the lens units must have strengthened refractive powers. In such a case, the second positive subunit G12 has a relatively strong refractive power in the first lens, unit G1, which is a positive lens unit, and the second positive subunit G12 produces negative spherical aberration and positive coma in large amounts. Since the negative refractive power of the first negative subunit G11 cannot be strengthened so much as that of the second positive subunit G12, the negative spherical aberration and the positive coma are hardly corrected in the lens unit.

Therefore, at least an aspherical surface is used as a surface of the first negative subunit G11 to be disposed in the fist lens unit G1, so that the first negative subunit G11 produces positive spherical aberration and negative coma in large amounts, which function to cancel the negative spherical aberration and the positive coma produced by the second positive subunit G12.

Furthermore, the zoom lens system according to the present invention which has any one of the compositions described above is characterized in that it comprises an aspherical surface layer which is formed on a surface of the negative lens component disposed in the first lens unit G1 by coating a transparent resin and drying it.

In all the compositions of the zoom lens system according to the present invention, the negative lens component disposed in the first lens unit G1 is configured so as to satisfy the condition (5) and have a refractive power of a certain degree. When an aspherical surface is to be disposed on the negative lens component, to be disposed in the first lens unit G1, it is therefore desirable for preventing the adverse influences due to the variations of temperature and humidity to use a molded glass lens component as the negative lens component, but the molded glass lens component is expensive and enhances a manufacturing cost of the zoom lens system.

The manufacturing cost of the zoom lens system can be lowered relatively by using, as an aspherical lens component, the so-called hybrid lens component composed of a spherical glass lens component and a thin aspherical surface layer made of a resin which is coated over the glass lens component, hardened and brought into close contact with the glass lens component. Moreover, the hybrid lens component allows a remarkably thin resin layer to be formed thereon and has a surface kept in close contact with the glass lens component, thereby providing a functional effect to be substantially free from the influences due to the variations of temperature and humidity as compared with an aspherical plastic lens component.

The zoom lens system according to the present invention that has another composition is characterized in that it has the composition describe above comprising a hybrid lens component and satisfies the following condition (9):

$$2.0 < |f_H|/D \tag{9}$$

wherein the reference symbol $f_H$ represents an axial focal length of a resin layer of the hybrid lens component and the reference symbol D designates a diagonal length of an image surface.

When the condition (9) is satisfied, the resin layer is nearly uniformly thick, thereby minimizing the adverse influences due to the variations of temperature and humidity.

If the lower limit of the condition (9) is exceeded, a resin layer has a strong refractive power, and is greatly influenced by temperature and humidity.

The zoom lens system according to the present invention, which has a fifth composition comprises, in order from the object side, a first lens unit G1 having a positive refractive power and a second lens unit G2 having a negative refractive power, and is configured to change the magnification from a wide position to a teleposition by moving the lens units toward the object side so as to narrow the airspace reserved between the first lens unit G1 and the second lens unit G2, that the first lens unit G1 comprises, in order from the object side, a first negative subunit G11 and a second positive subunit G12, that the first negative subunit disposed in the first lens unit G1 comprises, in order from the object side, a negative lens element L1 having a radius of curvature on the object side which is smaller than that on the image side and a meniscus lens component L2 having a convex surface on the object side, that the second positive subunit G12 disposed in the first lens unit G1 comprises at least a negative lens component L3 and a positive lens component L4, that the second lens unit G2 comprises at least a positive lens component L5 and a negative lens component L6, and that the zoom lens system satisfies the following conditions (8) and (6)

$$0.2 < |f_{1F}/D| < 2.1 \quad (8)$$

$$5 < v_d(R) - v_d(F) < 20 \quad (6)$$

wherein the reference symbol fl, represents the focal length of the negative lens component disposed in the first lens unit, the reference symbol D designates a diagonal length of an image surface, the reference symbol $v_d(R)$ denotes an Abbe's number of the negative lens component disposed on the image side, and the reference symbol $v_d(F)$ represents an Abbe's number of the negative lens component disposed on the object side.

The zoom lens system according to the present invention, which has the fifth composition, wherein the first lens unit G1 is configured as a retrofocus type composed, in order from the object side, of the first subunit G11 having a negative refractive power and the second subunit G12 having a positive refractive power, and is capable of displacing a principal point of the first lens unit G1 toward an image surface, reserving a sufficient back focal length at a wide position and favorably correcting positive distortion.

Description will be made of a reason why the first negative subunit G11 of the first lens unit G1 comprises, in order from the object side, the negative lens component L1 having a radius of curvature on the object side which is smaller than that on the image side and the meniscus lens component L2 having the convex surface on the object side. A zoom lens system which is composed of two lens units, like the zoom lens system according to the present invention cannot exhibit favorable optical performance as a whole, regardless of a change of a magnification, when aberrations are not corrected favorably in each of the lens units independently. In a composition such as that adopted for the zoom lens system according to the present invention, in particular wherein the first lens unit G1 has a positive refractive power, the second positive subunit has a relatively strong refractive power. Accordingly, the second positive subunit G12 produces negative spherical aberration and astigmatism in large amounts. When the zoom lens system has a vari-focal ratio of 2.5 or higher, as the zoom lens system according to the present invention, astigmatism is produced in a large amount at an intermediate focal length in particular, thereby remarkably degrading imaging performance at marginal portions of an image. This problem is more remarkable when the total length of the zoom lens system is shortened by strengthening refractive powers of the lens units.

To correct aberrations favorably in the second positive subunit G12, the meniscus lens component L2, having the convex surface on the object side, is disposed in the first negative subunit G11 of the first lens unit G1 so that it produces positive spherical aberration and negative coma in large amounts, which cancel negative spherical aberration and positive coma, thereby reducing aberration in the zoom lens system as a whole. Furthermore, the negative lens component L1, having the radius of curvature on the object side which is smaller than that on the image side is disposed in the first negative subunit G11 so that it produces positive astigmatism in a large amount, which cancels negative astigmatism, thereby reducing aberration in the zoom lens system as a whole.

Speaking of locations of the negative lens component L1, having a radius of curvature on the object side which is smaller than that on the image side, and the meniscus lens component L2, having the convex surface on the object side, it is desirable that the lens component which produces astigmatism in large amounts is disposed at a location where an off-axial ray is high, or which is shifted toward the object side, and the lens component which produces spherical aberration and coma in large amounts is disposed at a location where the off-axial ray is relatively high, or which is shifted toward the image side. These locations of the lens components are selected for most efficient correction of aberrations in the first lens unit G1.

Considering the fact that the first negative subunit G11 of the first lens unit G1 is incapable of correcting chromatic aberration independently in the first negative subunit G11 when it is composed only of a negative lens component, the second positive subunit G12 comprises at least the negative lens component L3 and the positive lens component L4, and the second positive subunit G11, which has the composition described above, is capable of correcting chromatic aberration favorably in the first lens unit G1. Similarly, the second lens G2 comprises at least the positive lens component L3 and the negative lens component L4 so that it can correct chromatic aberration favorably in the second lens unit G2.

The condition (8) is required to configure compactly an optical system which uses the zoom lens system according to the present invention, and the first lens unit G1 can have a short total length on the optical axis when the first negative subunit G11 to be disposed in the first lens unit G1 has a focal length which satisfies the condition (8).

When the first negative subunit G11 to be disposed in the first lens unit G1 has a refractive power strengthened so as to satisfy the condition (8), the second positive subunit G12 also has a strengthened refractive power, thereby strengthening the refractive power of the first negative subunit G11 in the first lens unit G1. Accordingly, the distance between principal points of the first negative subunit G11 and the second positive subunit G12 is shortened, thereby allowing placement of the first lens unit G1 so as to have a short total length on the optical axis. Since such a short total length allows the first lens unit G1 to reserve a sufficient back focal length, the second lens unit G2 can be disposed at a location shifted toward the object side and the zoom lens system as a whole can have a long back focal length. Furthermore, a light bundle which passes through an outermost portion of the second lens unit G2 is lowered, thereby making it possible to configure the second lens unit G2 and the lens barrel so as to have shorter diameters.

When the condition (8) is satisfied, the zoom lens system can have a short total length on the optical axis and the lens barrel can have a short diameter as described above, whereby an optical instrument which uses the zoom lens system according to the present invention can be configured compactly.

If the lower limit of the condition (8) is exceeded, an advantage for compact configuration will be obtained, but the first lens unit will produce negative spherical aberration and positive coma in large amounts, thereby making it difficult to correct aberrations favorably in the zoom lens system as a whole. If the upper limit of the condition (8) is exceeded, in contrast, it will be difficult to configure compactly an optical instrument which uses the zoom lens system according to the present invention.

When the condition (6) is satisfied, the zoom lens system according to the present invention, which has the fifth composition, exhibits functional effects similar to those of the zoom lens system according to the present invention that has the first composition, and has favorable aberration correcting functions.

The zoom lens system according to the present invention, which has another composition, is characterized in that at least an aspherical surface is used as a surface of the second lens unit G2 in any one of the first through fifth compositions.

Since the second lens unit G2 has a negative refractive power as a whole in the zoom lens system according to the present invention, the negative lens component has a relatively strong refractive power when the refractive power of the second lens unit G2 is strengthened to shorten a total length of the zoom lens system as a whole. Accordingly, the negative lens component disposed in the second lens unit G2 produces positive spherical aberration in a large amount, at the teleposition in particular. In the zoom lens system according to the present invention, which has the composition described above, at least an aspherical surface is used as a surface of the second lens unit G2 to produce negative spherical aberration which cancels the positive spherical aberration. The aspherical surface facilitates a shortening of the a total length of the zoom lens system and serves to configure a camera compactly.

Since the second lens unit has a refractive power of a certain degree to shorten the total length of the zoom lens system as a whole, it is desirable to configure an aspherical lens component as a molded glass lens component, or the inexpensive hybrid lens component described above which is to be disposed in the second lens unit G2. Such an aspherical lens component exhibits a functional effect that it is almost free from the influences due to temperature and humidity as compared with an aspherical plastic lens component.

Furthermore the zoom lens system according to the present invention, which has still another composition, is characterized in that it uses an aspherical surface layer which is hardened by coating it with a transparent resin layer in the second lens unit in any of the first through fifth compositions.

The hybrid lens component that is to be used as the aspherical lens component can be manufactured at a relatively low cost. Moreover, the hybrid lens component allows a very thin resin layer to be formed thereon, and has a surface kept in close contact with a glass lens component, thereby exhibiting a functional effect that is almost free from the influences due to temperature and humidity as compared with an spherical plastic lens component.

It is desirable to satisfy the condition (9) when an aspherical lens component is configured as a hybrid lens component, as in the composition described above. When the condition (9) is satisfied, a resin layer has a thickness which is substantially uniform relative to a glass surface which is in close contact with it, thereby capable of minimizing the influences due to temperature and humidity.

The zoom lens system according to the present invention, which has a sixth composition, comprises, in order from the object side, a first lens unit G1 having a positive refractive power and a second lens unit G2 having a negative refractive power, and is configured to change the magnification from a wide position to a teleposition by moving the lens units toward the object side so as to narrow the airspace reserved between the first lens unit G1 and the second lens unit G2, that the first lens unit G1 comprises at least a negative lens component L1 and a positive lens component L2, that the second lens unit G2 comprises at least a negative lens component L3 and a positive lens component L4, and that an aspherical layer which is hardened by applying a transparent resin layer is formed as a surface of the negative lens component L1 disposed in the first lens unit G1.

The zoom lens system according to the present invention, which has the sixth composition, wherein each of the lens units G1 and G2 comprises at least the positive lens component, and the negative lens component is capable of correcting chromatic aberration to a certain degree in each of the lens units, thereby correcting chromatic aberration favorably in the zoom lens system as a whole.

To shorten a total length of the zoom lens system while maintaining its vari-focal ratio exceeding 2.5, it is required to strengthen the refractive power of each lens unit to a certain degree. In this case, the positive lens component has a relatively strong refractive power in the first lens unit G1 which has the positive refractive power, thereby producing negative spherical aberration and positive coma in large amounts. Since the refractive power of the negative lens component is not strengthened so much as the refractive power of the positive lens component, it is difficult to correct these aberrations in the first lens unit G1.

In the zoom lens system according to the present invention, which has the sixth composition, at least an aspherical surface is used as a surface of the negative lens component disposed in the first lens unit G1 to produce positive spherical aberration and negative coma in large amount, thereby canceling the negative spherical aberration and the positive coma produced by the positive lens component.

Furthermore, the zoom lens system according to the present invention can be manufactured at a relatively low cost since a hybrid lens component is used as an aspherical lens component. A hybrid lens component allows a very thin resin layer to be formed thereon and has a surface which is kept in close contact with a glass surface, thereby exhibiting a functional effect that it is almost free from influences due to temperature and humidity as compared with an aspherical plastic lens component.

Furthermore, the zoom lens system according to the present invention, which has the sixth composition, is characterized in that it uses at least an aspherical surface in the second lens unit G2.

Since the second lens unit G2 of the zoom lens system according to the present invention is a negative lens unit as a whole, the negative lens component has a relatively strong refractive power in the second lens unit G2 when a refractive power of this lens unit is strengthened to shorten the total length of the lens system as a whole. Accordingly, the negative lens unit disposed in the second lens unit G2 produces positive spherical aberration at the teleposition in particular. Therefore, at least an aspherical surface is used to produce negative spherical aberration, thereby functioning to cancel the positive spherical aberration. The aspherical surface facilitates to shorten the total length of the zoom lens system as a whole, and allows a camera to be configured compactly.

In order to prevent the influences due to temperature and humidity, it is proper to dispose the aspherical surface described above, for example, on a molded glass lens component.

The aspherical surface described above is characterized in that it is composed of an spherical surface layer which is hardened by applying a layer of a transparent resin.

Since a molded glass lens component is expensive, the zoom lens system, which has the composition described above, adopts the so-called hybrid lens component, which can be manufactured at a relatively low cost by forming a thin aspherical layer on a spherical glass lens component and hardening the layer so as to be in close contact with a spherical glass lens component.

As compared with an aspherical plastic lens component, the hybrid lens component is substantially free from the influences due to temperature and humidity since it has the thin layer which can be formed by coating a spherical glass lens component with a transparent resin layer and hardening it so as to keep an aspherical surface in close contact with the glass lens component.

The hybrid lens component is characterized in that it satisfies the condition (9).

When the hybrid lens component satisfies the condition (9), its resin layer that is kept in close contact with the glass lens component has a substantially uniform thickness, whereby the hybrid lens component can minimize the influences due to temperature and humidity.

For the zoom lens system according to the present invention, which has been described above, it is preferable to satisfy, in place of the condition (5), the following condition (5-1) or (5-2):

$$0.2<|f_{1N}/D|<1.9 \quad (5\text{-}1)$$

$$0.2<|f_{1N}/D|<1.7 \quad (5\text{-}1)$$

Furthermore, it is preferable to satisfy, in place of the condition (6), the following condition (6-1) or (6-2):

$$5<v_d(R)-v_d(F)<17 \quad (6\text{-}1)$$

$$5<v_d(R)-v_d(F)<14 \quad (6\text{-}2)$$

Furthermore, it is preferable to satisfy, in place of the condition (7), the following condition (7-1) or (7-2):

$$-3.8<(R_2+R_1)/(R_2-R_1)<-0.9 \quad (7\text{-}1)$$

$$-2.3<(R_2+R_1)/(R_2-R_1)<-0.9 \quad (7\text{-}1)$$

It is desirable to replace the upper limit of −0.9 with an upper limit of −1.1 in the above-mentioned condition (7-1) or (7-2). That is, it is desirable to satisfy, in place of the condition (7-1) or (7-2), the following condition (7-3) or (7-4):

$$-3.8<(R_2+R_1)/(R_2-R_1)<-1.1 \quad (7\text{-}3)$$

$$-2.3<(R_2+R_1)/(R_2-R_1)<-1.1 \quad (7\text{-}4)$$

Furthermore, it is more desirable to replace the upper limit of −0.9 with an upper limit of −1.3 in the condition (7-1) or (7-2). That is, it is more desirable to satisfy, in place of the condition (7-1) or (7-2), the following condition (7-5) or (7-6):

$$-3.8<(R_2+R_1)/(R_2-R_1)<-1.3 \quad (7\text{-}5)$$

$$-2.3<(R_2+R_1)/(R_2-R_1)<-1.3 \quad (7\text{-}6)$$

Furthermore, it is more preferable to satisfy, in place of the condition (8), the following condition (8-1) or (8-2):

$$0.2<|f_{1F}/D|<1.8 \quad (8\text{-}1)$$

$$0.2<|f_{1F}/D|<1.5 \quad (8\text{-}1)$$

A first embodiment corresponds to the zoom lens system according to the present invention which has the first composition, and comprises, in order from the object side as shown in FIG. 1, a first lens unit G1 comprising a first subunit G11 which consists of a negative biconcave lens component L1 having a radius of curvature on the image side smaller than that on the object side, and a negative meniscus lens component L2 having a convex surface on the object side, and a second subunit G12 which consists of a positive biconvex lens component L3, and a second lens unit comprising an aperture stop, a positive meniscus lens component 14 which has a concave surface on the object side, and a negative meniscus lens component L5, which has a concave surface on the object side.

The first lens unit G1, having a positive refractive power, is composed of the negative biconcave lens element L1, the negative meniscus lens component L2 and the positive biconvex lens component L3, whereas the second lens unit, having a negative refractive power, is composed of the positive meniscus lens component L4 and the negative meniscus lens component L5. In the first lens unit G1, the first negative subunit G11, having a negative refractive power, is composed of the negative biconcave lens component L1 and the negative meniscus lens component L2, and the second positive subunit G12 is composed of the positive biconvex lens component L3.

To change the magnification from a wide position to a teleposition, the lens units are moved toward the object side so as to narrow the airspace reserved between the first lens unit G1 and the second lens unit G2. To focus the first embodiment, it is desirable to move the first lens unit G1 toward the object side.

In the first embodiment, the negative meniscus lens component L2 and the positive meniscus lens component L4 are aspherical molded glass lens components.

The first embodiment has a vari-focal ratio of 2.36 and a field angle 2ω of 60.82° at a wide position.

Figure 2:
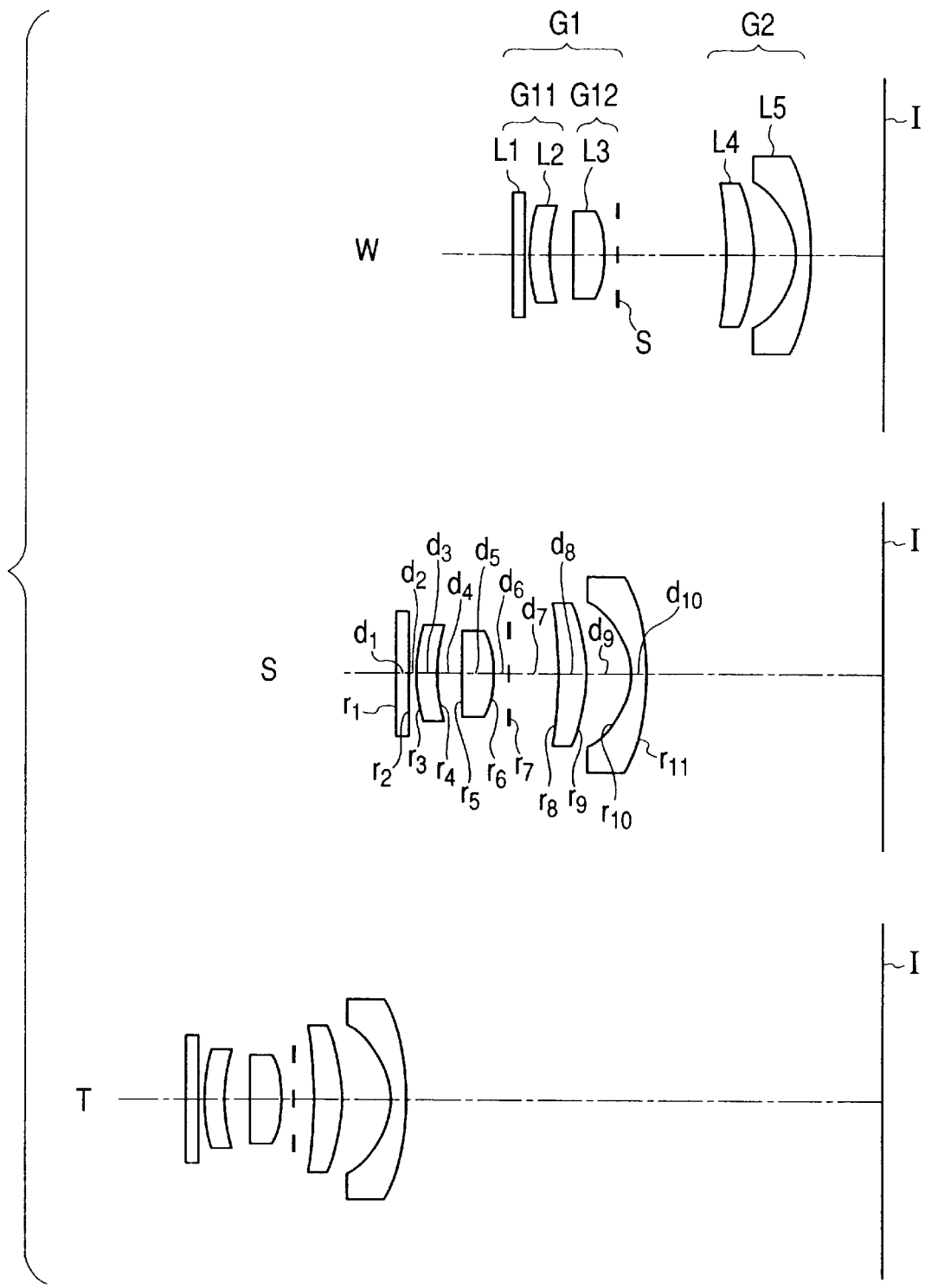

A second embodiment corresponds to the zoom lens system according to the present invention which has the first composition, which comprises, in order from the object side as shown in FIG. 2, a negative biconcave lens component L1 which has a radius of curvature on the image side smaller than that on the object side, a negative meniscus lens component L2 which has a convex surface on the object side, a positive biconvex lens component L3, an aperture stop S, a positive meniscus lens component L4 which has a concave surface on the object side, and a negative meniscus lens component L5 which has a concave surface on the object side.

The negative biconcave lens component L1, the negative meniscus lens component L2, and the positive biconvex lens component L3 compose a first lens unit G1, having a positive refractive power, whereas the positive meniscus lens component L4 and the negative meniscus lens component L5 compose a second lens unit G2, having a negative refractive power. In the first lens unit G1, the negative biconcave lens component L1 and the negative meniscus lens component L2 compose a first negative subunit G11, whereas the positive biconvex lens component L3 composes a second positive subunit G12. To change a magnification from a wide position to a teleposition, the lens units are moved so as to narrow the airspace reserved between the first lens unit and the second lens unit. It is desirable to move the first lens unit G1 toward the object side to focus the second embodiment.

In the second embodiment, the negative meniscus lens component, L2 is an aspherical molded plastic lens component and the positive meniscus lens component L4 is an aspherical molded glass lens component.

The second embodiment has a vari-focal ratio of 2.07 and a field angle 2ω of 61.06° at a wide position.

Figure 3:
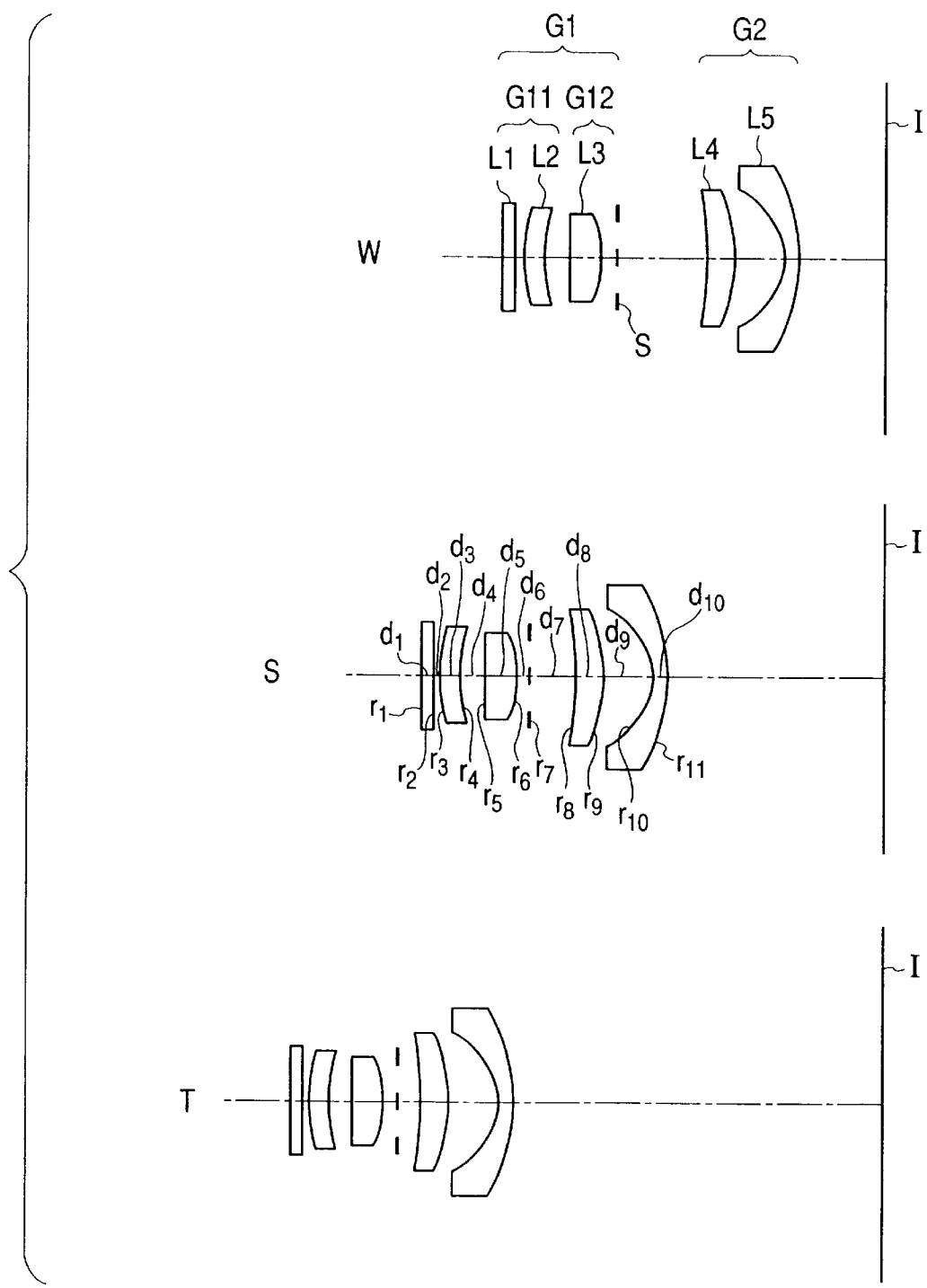

A third embodiment corresponds to the zoom lens system according to the present invention which has the second composition, which comprises, in order from the object side as shown in FIG. 3, a negative biconcave lens component L1 which has a radius of curvature on the image side smaller than that on the object side, a negative meniscus lens component L2 which has a convex surface on the object side, a positive biconvex lens component L3, an aperture stop S, a positive meniscus lens component L4 which has a concave surface on the object side, and a negative meniscus lens component L5 which has a concave surface on the object side.

The negative biconcave lens component L1, the negative meniscus lens component L2, and the positive biconvex lens component L3 compose a first lens unit G1 having a positive refractive power, whereas the positive meniscus lens component L4 and the negative meniscus lens component compose a second lens unit G2 having a negative refractive power. In the first lens unit G1, the negative biconcave lens component L1 and the negative meniscus lens component L2 compose a first negative subunit G11, whereas the positive biconvex lens component L3 composes a second positive subunit G12.

To change the magnification from a wide position to a teleposition, the lens units are moved toward the object side so as to narrow the airspace reserved between the first lens unit G1 and the second lens unit G2. It is desirable to move the first lens unit G1 toward the object side to focus the third embodiment.

In the third embodiment, the negative meniscus lens component L2 and the positive meniscus lens component L4 are aspherical molded plastic lens components.

Furthermore, it is possible to configure the positive meniscus lens component L4 as a plastic lens component lens less influenced by humidity by selecting a polymethyl methacrylate resin, having a low hygroscopicity, as a material for the positive meniscus lens component L4.

The third embodiment has a field angle 2ω of 61.4° at a wide position.

Figure 4:
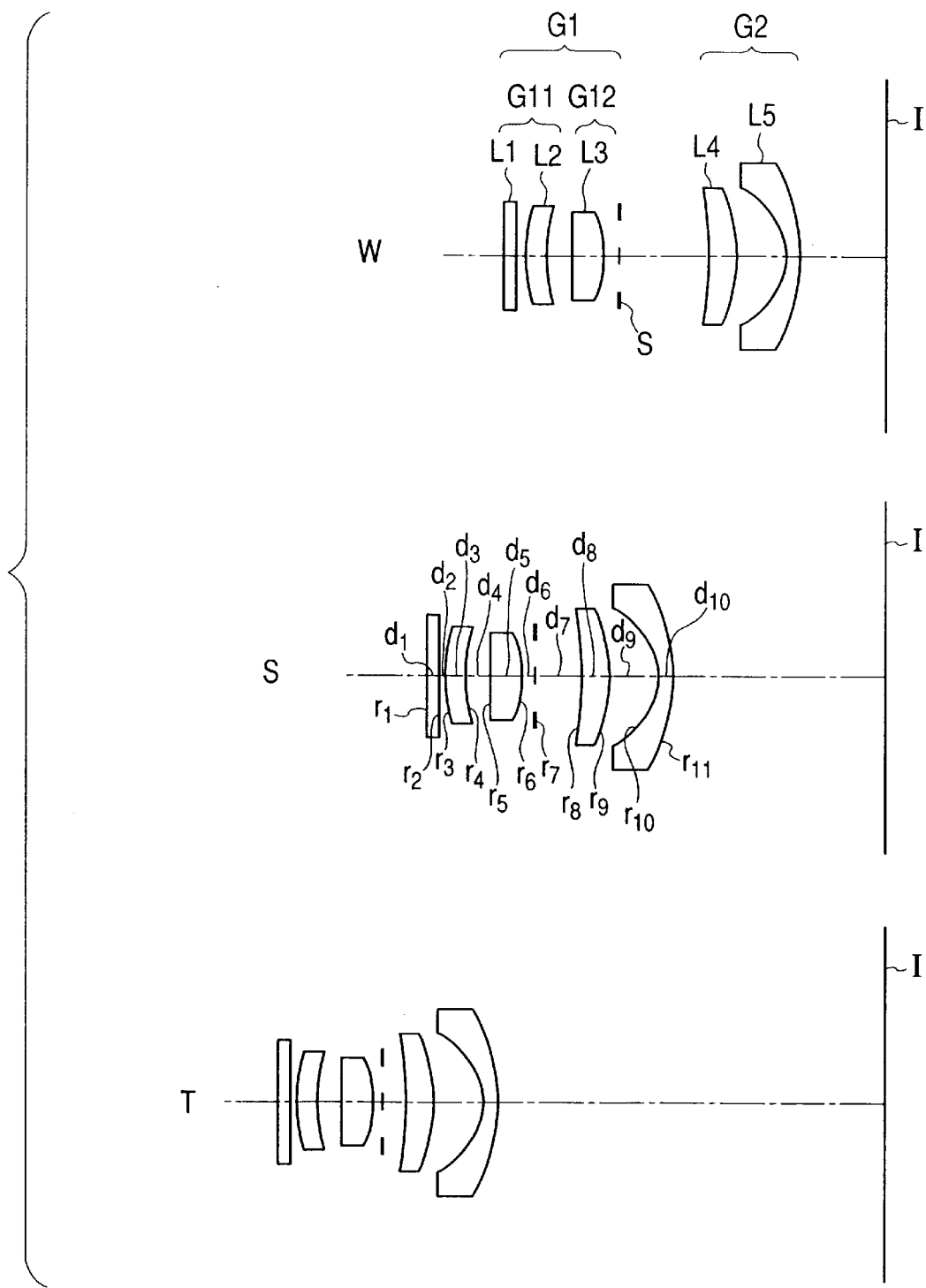

A fourth embodiment corresponds to the zoom lens system according to the present invention which has the second composition which comprises, in order from the object side as shown in FIG. 4, a negative biconcave lens component L1 which has a radius of curvature on the image side smaller than that on the object side, a negative meniscus lens component L2 which has a convex surface on the objects side, a positive biconvex lens component L3, an aperture stop S, a positive meniscus lens component L4 which has a concave surface on the object side, and a negative meniscus lens component L5 which has a concave surface on the object side. That is, the fourth embodiment comprises a first lens unit G1, having a positive refractive power, which is composed of the negative biconcave lens component L1, the negative meniscus lens component L2, and the positive biconvex lens component L3, and a second lens unit G2, having a negative refractive power, which is composed of the positive meniscus lens component L4 and the negative meniscus lens component L5. The first lens unit G1 comprises a first negative subunit G11 which is composed of the negative biconcave lens component L1 and the negative meniscus lens component L2, and a second positive subunit G12 which is composed of the positive biconvex lens component L3.

To change the magnification of the fourth embodiment, the lens units are moved toward the object side so as to narrow the airspace reserved between the first lens unit and the second lens unit. It is desirable to move the first lens unit toward the object side to focus the fourth embodiment.

In the fourth embodiment, the negative meniscus lens component L2 and the positive meniscus lens component L4 are aspherical molded plastic lens components. In the zoom lens system preferred as the fourth embodiment, the positive meniscus lens component L4 is configured as a plastic lens component which is made of a polymethyl methacrylate acrylic resin having a low hygroscopicity so that it is less influenced by humidity.

The fourth embodiment has a vari-focal ratio of 2.04 and a field angle 2ω of 61.2° at a wide position.

A fifth embodiment corresponds to the zoom lens system according to the present invention which has the third or fourth composition, which comprises, in order from the object side as shown in FIG. 5, a first lens unit G1 comprising a first negative subunit G11, which comprises a negative meniscus lens component L1, having a convex surface on the object side, and a second positive subunit G12, which comprises a cemented lens component consisting of a negative meniscus lens element L2, having a convex surface on the object side, and a positive biconvex lens element L3, and a second lens unit G2, comprising an aperture stop S, a positive meniscus lens component L4, having a concave surface on the object side, and a negative meniscus lens component L5, having a concave surface on the object side, and is configured to change the magnification from a wide position to a teleposition by moving the lens units so as to narrow the airspace reserved between the first lens unit and the second lens unit.

To focus the fifth embodiment, it is desirable to move the first lens unit G1 toward the object side.

In the fifth embodiment, aspherical surfaces are used as an image side surface of the lens component L1 and an object side surface of the lens component L4: the lens component L1 and the lens component L4 being configured as aspherical molded glass lens components.

The fifth embodiment has a vari-focal ratio of 2.70.

Figure 6:
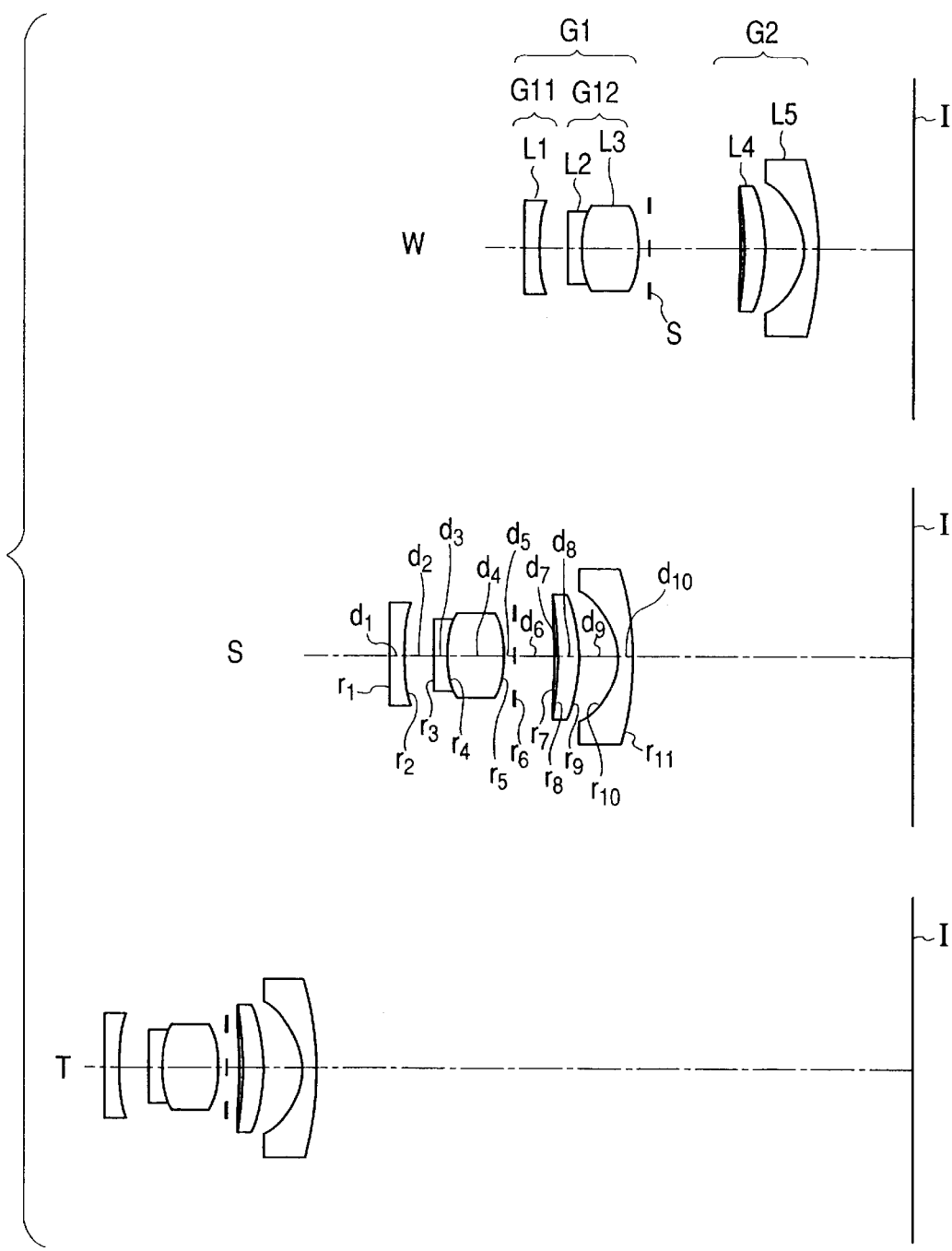

A sixth embodiment corresponds to the zoom lens system according to the present invention having the third or fourth composition, which comprises, in order from the object side as shown in FIG. 6, a first negative subunit G11, comprising a negative meniscus lens component L1 having a convex surface on the object side, a second positive subunit G12, comprising a cemented lens component consisting of a negative meniscus lens element L2 having a convex surface on the object side, and a positive biconvex lens element L3; an aperture stop S, a positive meniscus lens component L4 having a concave surface on the object side, and a negative meniscus lens component L5 having a concave surface on the object side, and is configured to change the magnification from a wide position to a teleposition by moving the lens units toward the object side so as to narrow the airspace reserved between the lens unit G1 and the lens unit G2. To focus the sixth embodiment, it is desirable to move the first lens unit G1 toward the object side.

In the sixth embodiment, aspherical surfaces are used as an image side surface of the lens component L1 and an object side surface of the lens component L4: the lens component L1 being configured as an aspherical molded glass lens component, and the lens component L4 being configured as an aspherical hybrid lens component with which an aspherical resin layer is kept in close contact.

Unlike a molded glass lens component, which is expensive, the hybrid lens component can be manufactured at a low cost and remarkably reduce the influences due to temperature and humidity, owing to a surface of a transparent resin layer which is kept in close contact with a glass lens component, though the hybrid lens component uses a plastic material.

Figure 7:
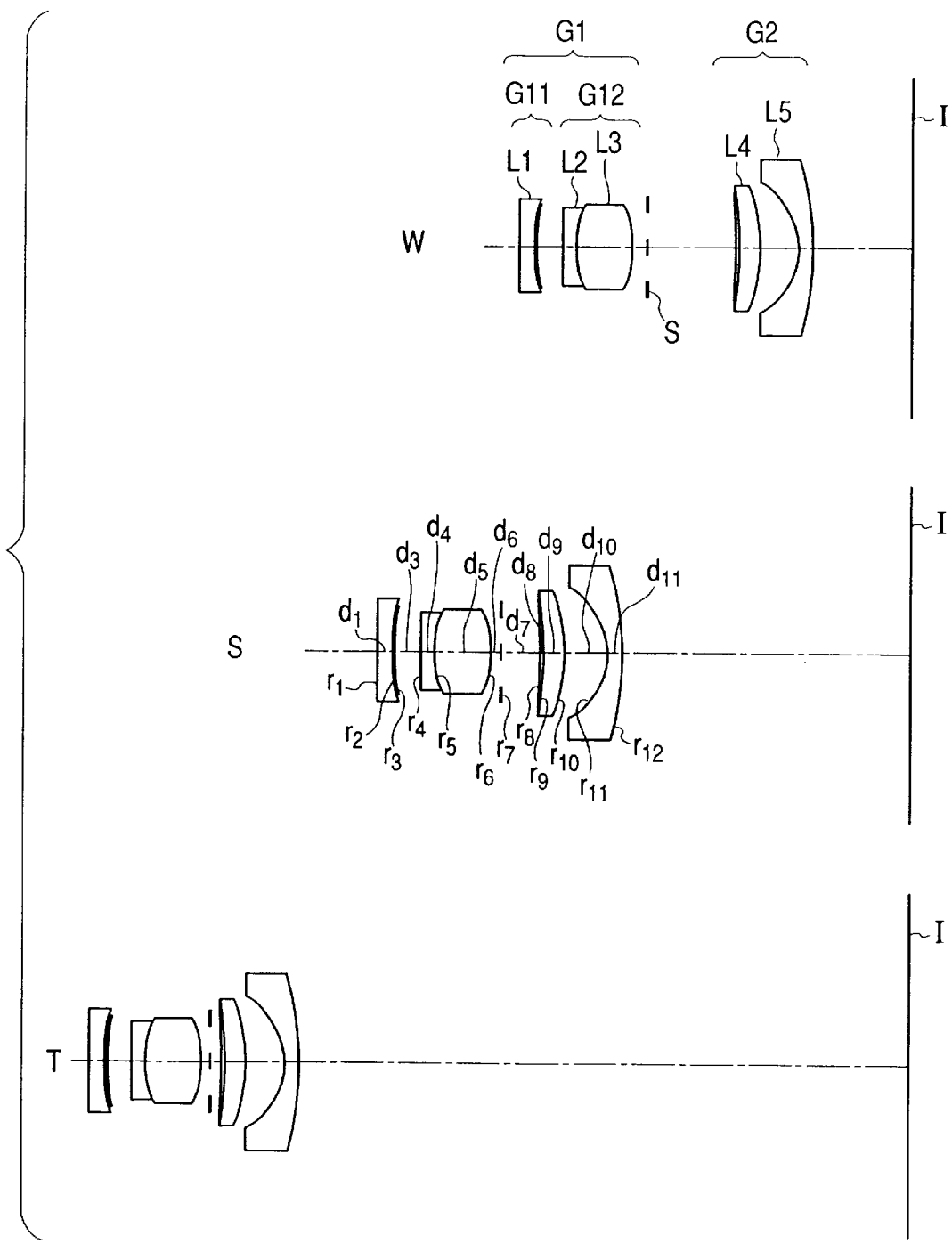

A seventh embodiment corresponds to the zoom lens system according to the present invention having the third, fourth or fifth composition, which comprises, in order from the object side as shown in FIG. 7, a first lens unit G1 comprising a first negative subunit G11 which is composed of a negative meniscus lens component L1, having a convex surface on the object side and second positive subunit G12, which is composed of a cemented lens component consisting of a negative meniscus lens element L2 having a convex surface on the object side and a positive biconvex lens element L3, an aperture stop, and a second lens unit G2 comprising a positive meniscus lens component L4 having a concave surface on the object side and a negative meniscus lens component LS having a concave surface on the object side, and is configured to change the magnification from a wide position to a teleposition by moving the lens units so as to narrow the airspace reserved between the first lens unit G1 and the second lens unit G2. It is desirable to focus the seventh embodiment by moving the first lens unit G1 toward the object side.

In the seventh embodiment, aspherical surfaces are used on the image side surface and the object side surface of the lens component L1 and the lens component L4, respectively, which are configured as aspherical hybrid lens components kept in close contact with aspherical resin layers. Accordingly, the seventh embodiment can be manufactured at relative low cost, and is influenced remarkably little by temperature and humidity, though the lens system uses a plastic material.

The seventh embodiment has a vari-focal ratio of 2.71.

Figure 8:
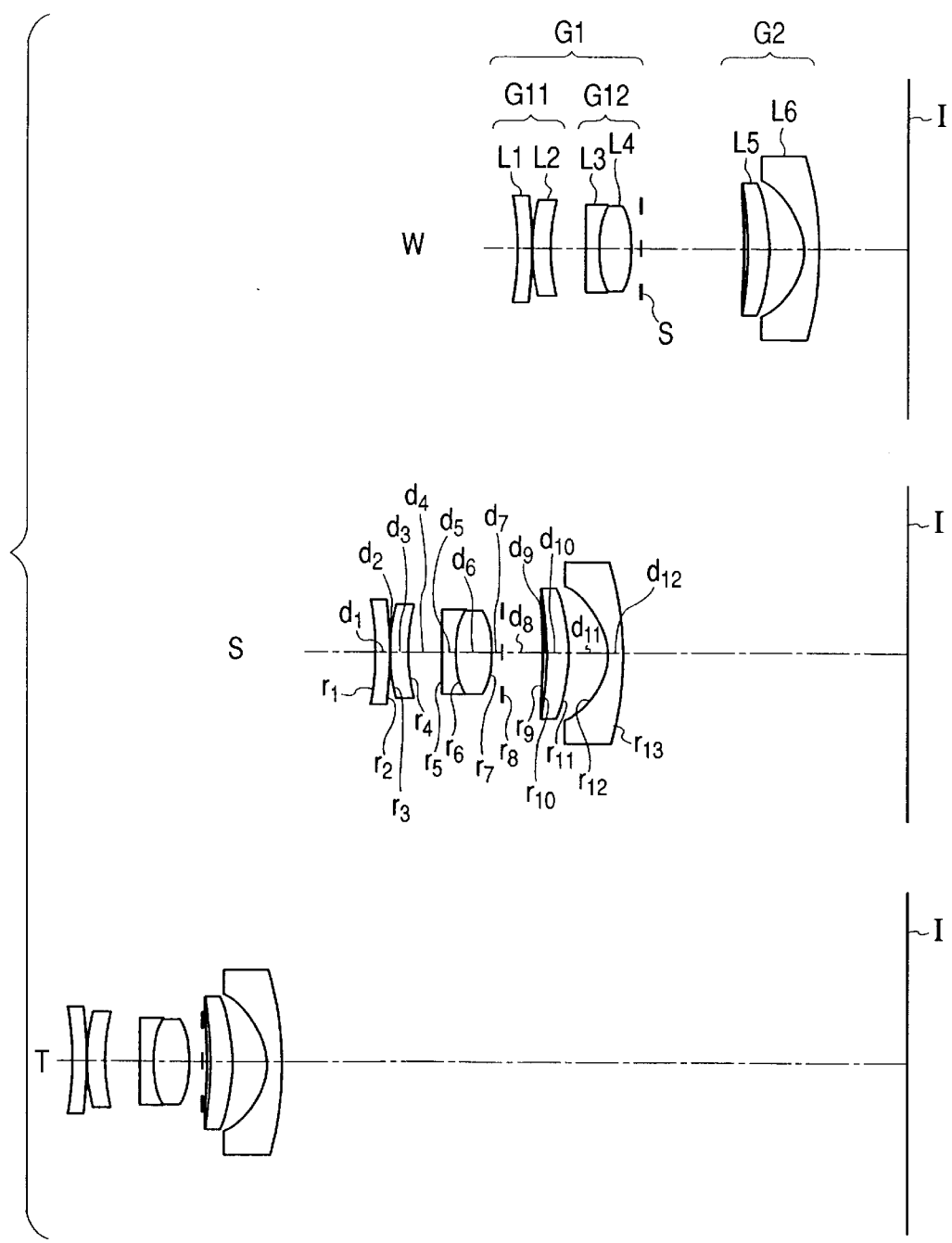

An eighth embodiment corresponds to the zoom lens system according to the present invention having the third composition, which comprises, in order from the object side as shown in FIG. 8, a first lens unit G1 comprising a first negative subunit G11 composed of a negative meniscus lens component L1, which has a concave surface on the object side, and a meniscus lens component L2, which has a convex surface on the object side and has no refractive power, and a second positive subunit G12, composed of cemented lens component consisting of a negative meniscus lens element L3 having a convex surface on the object side and a positive biconvex lens element L4, an aperture stop S, and a second lens unit G2, comprising a positive meniscus lens component L5, having a concave surface on the object side, and a negative meniscus lens component L6, having a concave surface on the object side, and is configured to change the magnification by moving the lens units so as to narrow the airspace reserved between the first lens unit G1 and the second lens unit G2.

It is desirable to focus the eighth embodiment by moving the first lens unit G1 toward the object side.

In the eighth embodiment, aspherical surfaces are used as an object side surface of the lens component L2, which is configured as an aspherical plastic lens component having no refractive power, and as an object side surface of the lens component L4, which is configured as an aspherical hybrid lens component which is kept in contact with an aspherical resin layer. The eighth embodiment is a zoom lens system which can be manufactured at a relatively low cost, and is influenced remarkably little by temperature and humidity though it uses a plastic material.

The eighth embodiment has a vari-focal ratio of 2.75.

The first through eighth embodiment described above have numerical data that is listed below:

Embodiment 1

$f = 28.77 \sim 43.99 \sim 67.92$ mm,
F number = $4.65 \sim 7.61 \sim 10.98$,
$\infty = 30.41° \sim 21.31° \sim 14.26°$,
$f_B = 6.95973 \sim 21.18914 \sim 43.57618$
$r_1 = -107.9718$
  $d_1 = 1.0000$   $n_1 = 1.78470$   $v_1 = 26.29$
$r_2 = 64.1717$
  $d_2 = 0.3000$
$r_3 = 13.3407$ (aspherical surface)
  $d_3 = 1.5000$   $n_2 = 1.69895$   $v_2 = 30.13$
$r_4 = 12.6075$ (aspheriial surface)
  $d_4 = 2.9915$
$r_5 = 67.2422$
  $d_5 = 2.8000$   $n_3 = 1.51633$   $v_3 = 64.14$
$r_6 = -8.8612$
  $d_6 = 0.8000$
$r_7 = \infty$ (stop)
  $d_7 = D$ (variable)
$r_8 = -33.1951$ (aspherical surface)
  $d_8 = 2.1470$   $n_4 = 1.57501$   $v_4 = 41.50$
$r_9 = -24.5356$
  $d_9 = 4.7422$
$r_{10} 0 = -8.0474$
  $d_{10} = 1.2000$   $n5 = 1.72916$   $v_5 = 54.68$
$r_{11} = -25.0093$
aspherical surface coefficients
3rd surface
$K = -0.0006$, $A_4 = -3.7009 \times 10^{-4}$, $A_6 = -1.6781 \times 10^{-5}$
  $A_8 = 1.8767 \times 10^{-9}$, $A_{10} = -4.8619 \times 10^{-11}$
4th surface
$K = -0.0006$, $A_4 = -9.7803 \times 10^{-4}$, $A_6 = -1.8403 \times 10^{-5}$
  $A_8 = 2.4915 \times 10^{-7}$, $A_{10} = -1.9281 \times 10^{-10}$
8th surface
$K = -0.0676$, $A_4 = 1.2760 \times 10^{-4}$, $A_6 = 1.3528 \times 10^{-6}$
  $A_8 = 6.7308 \times 10^{-9}$, $A_{10} = -2.5092 \times 10^{-11}$

| f | 28.77 | 43.99 | 67.92 |
|---|---|---|---|
| D | 9.53758 | 4.89457 | 1.80000 |

$|f_{G11}/D| = 1.38$,   $v_{L4} = 41.5$,   $v_{L5} = 54.68$

Embodiment 2

$f = 28.64 \sim 44.01 \sim 67.96$ mm,
F number = $4.65 \sim 7.15 \sim 11.03$,
$\infty = 30.53° \sim 21.30° \sim 14.25°$,
$f_B = 6.67530 \sim 21.18590 \sim 43.77995$
$r_1 = -101.5396$
  $d_1 = 1.0000$   $n_1 = 1.78470$   $v_1 = 26.29$
$r_2 = 68.3296$
  $d_2 = 0.3000$
$r_3 = 12.8008$ (aspherical surface)
  $d_3 = 1.5000$   $n_2 = 1.58423$   $v_2 = 30.49$
$r_4 = 12.1942$ (aspherical surface)
  $d_4 = 2.8953$
$r_5 = 72.2700$
  $d_5 = 2.8000$   $n_3 = 1.51633$   $v_3 = 64.14$
$r_6 = -8.9543$
  $d_6 = 0.8000$
$r_7 = \infty$ (stop)
  $d_7 = D$ (variable)
$r8 = -33.1480$ (aspherical surface)
  $d_8 = 2.2093$   $n_4 = 1.57501$   $v_4 = 41.50$
$r_9 = -24.5133$
  $d_9 = 4.7605$
$r_{01} 0 = -8.1596$
  $d_{10} = 1.2000$   $n_5 = 1.72916$   $v_5 = 54.68$
$r_{11} = -25.1338$
aspherical surface coefficients
3rd surface
$K = -0.0015$, $A_4 = -4.3261 \times 10^{-4}$, $A_6 = -2.1976 \times 10^{-5}$
  $A_8 = 9.1166 \times 10^{-8}$, $A_{10} = 1.3275 \times 10^{-10}$
4th surface
$K = 0.0005$, $A_4 = -1.1509 \times 10^{-4}$, $A_6 = -2.3823 \times 10^{-5}$
  $A_8 = 3.9941 \times 10^{-7}$, $A_{10} = -2.8692 \times 10^{-10}$
8th surface
$K = -0.0543$, $A_4 = -1.2482 \times 10^{-4}$, $A_6 = 1.2087 \times 10^{-6}$
  $A_8 = 6.8679 \times 10^{-9}$, $A_{10} = -5.8816 \times 10^{-13}$

| f | 28.64 | 44.01 | 67.96 |
|---|---|---|---|
| D | 9.85044 | 4.98960 | 1.80000 |

-continued $|f_{G11}/D| = 1.43$, $\nu_{L4} = 41.50$; $\nu_{L5} = 54.68$,
$|f_p|/D = 4.34$ (lens L2)

Embodiment 3

$f = 28.54 \sim 44.0 \sim 54.96$ mm,
F number = $4.65 \sim 6.52 \sim 8.95$,
$\infty = 30.70° \sim 23.30° \sim 17.48°$,
$f_B = 7.98199 \sim 19.07382 \sim 33.55542$
$r_1 = -188.7997$
   $d_1 = 1.0000$   $n_1 = 1.84666$   $\nu_1 = 23.78$
$r_2 = 62.9436$
   $d_2 = 0.4308$
$r_3 = 18.2226$ (aspherical surface)
   $d_3 = 1.5000$   $n_2 = 1.58423$   $\nu_2 = 30.49$
$r_4 = 17.5599$ (aspherical surface)
   $d_4 = 3.4811$
$r_5 = 56.4289$
   $d_5 = 2.8000$   $n_3 = 1.51633$   $\nu_3 = 64.14$
$r_6 = -9.0351$
   $d_6 = 1.0000$
$r_7 = \infty$ (stop)
   $d_7 = D$ (variable)
$r_8 = -21.0489$ (aspherical surface)
   $d_8 = 1.7777$   $n_4 = 1.49241$   $\nu_4 = 57.66$
$r_9 = -17.8258$ (aspherical surface)
   $d_9 = 4.8812$
$r_{10} 0 = -7.5554$
   $d_{10} = 1.2000$   $n5 = 1.74100$   $\nu_5 = 52.64$
$r_{11} 1 = -20.2518$ aspherical surface coefficients
3rd surface
$K = 0$, $A_4 = -2.8977 \times 10^{-4}$, $A_6 = -5.9615 \times 10^{-6}$
   $A_8 = -8.2693 \times 10^{-8}$, $A_{10} = 7.1913 \times 10^{-11}$
4th surface
$K = 0$, $A_4 = 8.7209 \times 10^{-5}$, $A_6 = -3.9321 \times 10^{-6}$
   $A_8 = 9.9717 \times 10^{-8}$, $A_{10} = -4.0327 \times 10^{-11}$
8th surface
$K = 0$, $A_4 = 1.9347 \times 10^{-4}$, $A_6 = 3.2239 \times 10^{-6}$
   $A_8 = -1.0630 \times 10^{-7}$, $A_{10} = 1.5554 \times 10^{-10}$
9th surface
$K = 0$, $A_4 = 8.6932 \times 10^{-6}$, $A_6 = 2.7178 \times 10^{-6}$
   $A_8 = -1.1459 \times 10^{-7}$, $A_{10} = -5.3802 \times 10^{-11}$
   f   28.54   44.0   54.96
   D   7.98702   4.47690   2.09682
$|f_{G11}/D| = 1.55$, $\nu_{L5} = 52.64$, $|f_p|/D = 144.93$ (lens L2)
$|f_p|/D = 5.80$ (lens L4)

Embodiment 4

$f = 28.57 \sim 41.0 \sim 58.23$ mm,
F number = $4.65 \sim 6.67 \sim 9.48$,
$\infty = 30.62° \sim 22.75°° \sim 16.53°$,
$f_B = 7.96977 \sim 19.82084 \sim 36.26252$
$r_1 = -190.8897$
   $d_1 = 1.0000$   $n_1 = 1.84666$   $\nu_1 = 23.78$
$r_2 = 63.1487$
   $d_2 = 0.3000$
$r_3 = 17.9869$ (aspherical surface)
   $d_3 = 1.5000$   $n_2 = 1.58423$   $\nu_2 = 30.49$
$r_4 = 17.1695$ (aspherical surface)
   $d_4 = 3.3271$
$r_5 = 59.9109$
   $d_5 = 2.8000$   $n_3 = 1.51633$   $\nu_3 = 64.14$
$r_6 = -8.8811$
   $d_6 = 0.8000$
$r_7 = \infty$ (stop)
   $d_7 = D$ (variable)
$r_8 = -21.6604$ (aspherical surface)
   $d_8 = 1.7622$   $n_4 = 1.49241$   $\nu_4 = 57.66$
$r_9 = -18.2320$ (aspherical surface)
   $d_9 = 5.0452$
$r_{10} = -7.6377$
   $d_{1 = 1.2000}$   $n5 = 1.72916$   $\nu_5 = 54.68$
$r_{11} = -21.9051$ aspherical surface coefficients
3rd surface
$K = 0$, $A_4 = -3.4446 \times 10^{-4}$, $A_6 = -7.7971 \times 10^{-6}$
   $A_8 = -5.1405 \times 10^{-8}$, $A_{10} = 3.8317 \times 10^{-12}$ -continued 4th surface
$K = 0$, $A_4 = 3.4760 \times 10^{-5}$, $A_6 = -5.5561 \times 10^{-6}$
   $A_8 = 1.5844 \times 10^{-7}$, $A_{10} = 1.7468 \times 10^{-11}$
8th surface
$K = 0$, $A_4 = 1.4524 \times 10^{-4}$, $A_6 = 3.7880 \times 10^{-6}$
   $A_8 = -1.5476 \times 10^{-7}$, $A_{10} = 2.0038 \times 10^{-10}$
9th surface
$K = 0$, $A_4 = -2.7151 \times 10^{-5}$, $A_6 = 2.9751 \times 10^{-6}$
   $A_8 = -1.4428 \times 10^{-7}$, $A_{10} = -6.5743 \times 10^{-11}$
   f   28.57   41.0   58.23
   D   7.93465   4.28474   1.80000
$|f_{G11}/D| = 1.53$, $\nu_{L5} = 54.68$, $|f_p|/D = 57.98$ (lens L2)
$|f_p|/D = 5.80$ (lens L4)

Embodiment 5

$f = 29.04 \sim 47.33 \sim 78.50$ mm,
F number = $4.6 \sim 7.5 \sim 12.5$,
$2\infty = 61.02° \sim 39.96°° \sim 24.80°$,
$f_B = 9.07263 \sim 26.49475 \sim 55.94007$
$r_1 = 108.3950$
   $d_1 = 1.5000$   $n_1 = 1.80610$   $\nu_1 = 40.73$
$r_2 = 31.2134$ (aspherical surface)
   $d_2 = 2.7200$
$r_3 = 63.1750$
   $d_3 = 1.2000$   $n_2 = 1.72342$   $\nu_2 = 37.95$
$r_4 = 12.8510$
   $d_4 = 5.4800$   $n_3 = 1.58913$   $\nu_3 = 61.14$
$r_5 = -9.3740$
   $d5 = 0.8000$
$r_6 = \infty$ (stop)
   $d_6 = D$ (variable)
$r_7 = -45.2526$ (aspherical surface)
   $d_7 = 2.1303$   $n_4 = 1.68893$   $\nu_4 = 31.16$
$r_8 = -23.6851$
   $d_8 = 3.8345$
$r_9 = -8.1819$
   $d_9 = 1.3000$   $n_5 = 1.75700$   $\nu_5 = 47.82$
$r_{10} = -39.5458$ aspherical surface coefficients
2nd surface
$K = 18.7934$, $A_4 = 1.7083 \times 10^{-4}$, $A_6 = 6.6546 \times 10^{-6}$
   $A_8 = -2.6797 \times 10^{-7}$, $A_{10} = 1.0951 \times 10^{-8}$
7th surface
$K = 0.4556$, $A_4 = 1.0912 \times 10^{-4}$, $A_6 = 1.4962 \times 10^{-6}$
   $A_8 = -7.5156 \times 10^{-9}$, $A_{10} = 1.5500 \times 10^{-10}$
   f   29.04   47.33   78.50.
   D   8.6000   4.0000   1.1000
$|f_{1N}|/D = 1.59$ (lens L1), $|f_{1N}|/D = 0.66$ (lens L2)
$\nu_d(R) - \nu_d(F) = 7.1$, $(R_2 + R_1)/(R_2 - R_1) = -1.81$ Embodiment 6

$f = 29.06 \sim 47.36 \sim 78.74$ mm,
F number = $4.6 \sim 7.5 \sim 12.5$,
$2\infty = 61.00° \sim 39.92°° \sim 24.72°$,
$f_B = 8.97909 \sim 26.23582 \sim 55.83008$
$r_1 = 109.9819$
   $d_1 = 1.5000$   $n_1 = 1.80610$   $\nu_1 = 40.73$
$r_2 = 31.3706$ (aspherical surface)
   $d_2 = 2.7229$
$r_3 = 63.3271$
   $d_3 = 1.2000$   $n_2 = 1.72342$   $\nu_2 = 37.95$
$r_4 = 12.8633$
   $d_4 = 5.4781$   $n_3 = 1.58913$   $\nu_3 = 61.14$
$r_5 = -9.3805$
   $d_5 = 0.8000$
$r_6 = \infty$ (stop)
   $d_6 = D$ (variable)
$r_7 = -44.4226$ (aspherical surface)
   $d_7 = 0.2500$   $n_4 = 1.52540$   $\nu_4 = 51.81$
$r8 = -66.3064$
   $d_8 = 1.8331$   $n_5 = 1.61293$   $\nu_5 = 36.99$
$r_9 = -23.6902$
   $d_9 = 3.8960$
$r_{10} = -8.0849$
   $d_{10 = 1.3000}$ $n6 = 1.74100$ $\nu_6 = 52.64$
$r_{11} = -38.1219$
aspherical surface coefficients -continued 2nd surface
K = 14.1468, $A_4$ = 1.9033 × $10^{-4}$, $A_6$ = 6.9992 × $10^{-6}$
  $A_8$ = −2.6338 × $10^{-7}$, $A_{10}$ = 1.1120 × $10^{-8}$
7th surface
K = −22.2132, $A_4$ = 1.1104 × $10^{-4}$, $A_6$ = 2.1749 × $10^{-6}$
  $A_8$ = −9.3544 × $10^{-9}$, $A_{10}$ = 1.2157 × $10^{-10}$
  f    29.06    47.36    78.74
  D    8.5827   4.0000   1.1000
$|f_{1N}|/D$ = 1.59 (lens L1), $|f_{1N}|/D$ = 0.66 (lens L2)
  $v_d(R) - v_d(F)$ = 11.9, $(R_2 + R_1)/(R_2 - R_1)$ = −1.8
$|f_H|/D$ = 7.46 (lens L4)

Embodiment 7 f = 29.00 ~ 47.42 ~ 78.68 mm,
F number = 4.6 ~ 7.6 ~ 12.5,
2∞ = 61.52°° ~ 40.02°° ~ 24.78°,
$f_B$ = 9.11641 ~ 26.88080 ~ 57.02632
$r_1$ = 263.9190
  $d_1$ = 1.3500    $n_1$ = 1.79952    $v_1$ = 42.22
$r_2$ = 30.5668
  $d_2$ = 0.1500    $n_2$ = 1.52540    $v_2$ = 51.81
$r_3$ = 43.0132 (aspherical surface)
  $d_3$ = 2.5161
$r_4$ = 72.4020
  $d_4$ = 1.2000    $n_3$ = 1.72342    $v_3$ = 37.95
$r_5$ = 12.4790
  $d_5$ = 5.6274    $n_4$ = 1.60311    $v_4$ = 60.64
$r_6$ = −9.4997
  $d_6$ = 0.8000
$r_7$ = ∞ (stop)
  $d_7$ = D (variable)
r8 = −33.3500 (aspherical surface)
  $d_8$ = 0.2500    $n_5$ = 1.52540    $v_5$ = 51.81
$r_9$ = −44.5032
  $d_9$ = 1.8000    $n_6$ = 1.61293    $v_6$ = 36.99
$r_{10}$ = −20.6465
  $d_{10}$ = 3.8446
$r_{11}$ = −7.9658
  $d_{11}$ = 1.3000    $n_7$ = 1.74100    $v_7$ = 52.64
$r_{12}$ = −32.9097
aspherical surface coefficients
3rd surface
K = 38.8850, $A_4$ = 3.2185 $10^{-4}$, $A_6$ = 1.0117 × $10^{-5}$
  $A_8$ = −4.2093 × $10^{-7}$, $A_{10}$ = 1.9157 × $10^{-8}$
8th surface
K = −97.0910, $A_4$ = −1.5964 × $10^{-4}$, $A_6$ = 1.1607 × $10^{-5}$
  $A_8$ = −2.1807 × $10^{-7}$, $A_{10}$ = 2.2890 × $10^{-9}$
  f    29.00    47.42    78.68
  D    8.6357   4.0000   1.1000
$|f_{1N}|/D$ = 1.59 (lens L1), $|f_{1N}|/D$ = 0.6 (lens L2) [
  $v_d(R) - v_d(F)$ = 10.4, $(R_2 + R_1)/(R_2 - R_1)$ = −1.39
$|f_H|/D$ = 5.8 (lens L1), $|f_H|/D$ = 7.4 (lens L4)

Embodiment 8 f = 28.67 ~ 47.20 ~ 78.86 mm,
F number = 4.6 ~ 7.6 ~ 12.7,
2∞ = 62.72° ~ 40.44° ~ 24.80°,
$f_B$ = 8.31243 ~ 26.89056 ~ 58.62645
$r_1$ −37.6299
  $d_1$ = 1.2000    $n_1$ = 1.79952    $v_1$ = 42.22
$r_2$ = 1394.2381
  $d_2$ = 0.2000
$r_3$ = 22.9698 (aspherical surface)
  $d_3$ = 1.5000    $n_2$ = 1.52542    $v_2$ = 55.78
$r_4$ = 22.4541
  $d_4$ = 3.4401
$r_5$ = 28.6292
  $d_5$ = 1.2000    $n_3$ = 1.72342    $v_3$ = 37.95
$r_6$ = 11.0958
  $d_6$ = 3.1401    $n_4$ = 1.58913    $v_4$ = 61.14
$r_7$ = −11.0958
  $d_7$ = 0.9500
r8 = ∞ (stop)
  $d_8$ = D (variable)
$r_9$ = −28.5717
  $d_9$ = 0.300.0    $n_5$ = 1.52540    $v_5$ = 51.81
$r_{10}$ = −39.3868
  $d_{10}$ = 2.0847    $n_6$ = 1.57501    $v_6$ = 41.50

-continued $r_{11}$ = −17.5385
  $d_{11}$ = 3.5974
$r_{12}$ = −7.9193
  $d_{12}$ = 1.3000    $n_7$ = 1.72916    $v_7$ = 54.68
$r_{13}$ = −29.8254
aspherical surface coefficients
3rd surface
K = 0.0, $A_4$ = −2.4953 × $10^{-4}$, $A_6$ = −4.3594 × $10^{-6}$
  $A_8$ = −1.0576 × $10^{-9}$
9th surface
K = −2.1815, $A_4$ = 1.3309 × $10^{-4}$, $A_6$ = 1.6863 × $10^{-6}$
  $A_8$ = 1.0558 × $10^{-8}$
  f    28.67    47.20    78.86
  D    9.5127   4.2000   0.9000
  $v_d(R) - v_d(F)$ = 12.5, $|f_{1F}/D|$ = 1.3,
$|f_H|/D$ = 5.8 (lens L5)

wherein the reference symbols $r_1, r_2, \ldots$ represent radii of curvature on surfaces of respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, the reference symbols $v_1, v_2, \ldots$ represent Abbe's number of the respective lens element, and the reference symbol $f_B$ designates a back focal length of the lens system. All lengths are expressed in a unit of millimeter. Furthermore, the reference symbols (W), (S) and (T) in the drawings represent a wide position, an intermediate focal length and a tele position respectively. The aspherical surfaces used in the embodiment have shapes that are expressed by a formula shown below:

$$x = (y^2/r)/[1+\{1+(1+k)/(y/r)^2\}^{1/2}] + A_4 y^4 + A_6 y^6 + A_8 y^8 + A_{10} y^{10}$$

wherein a light travelling directions along an optical axis is taken as x, a direction perpen-dicular to the optical axis is taken as y, the reference symbol r represents a paraxial radius of curvature, the reference symbol k designates a conical coefficient, and the reference symbols $A_4, A_6, A_8$ and $A_{10}$ denote aspherical surface coefficients.

Figure 9:
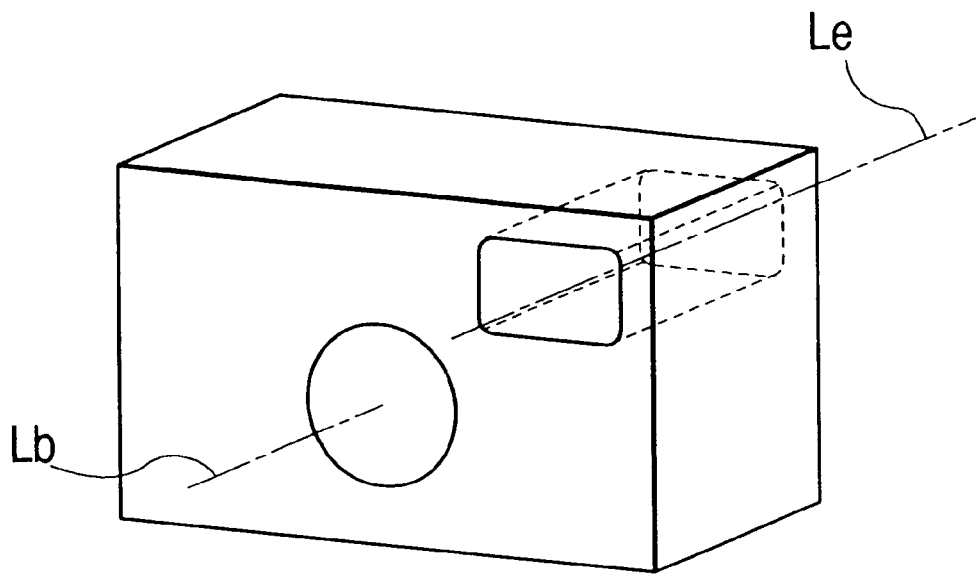
FIG. 9 is a perspective view showing an outline of a compact camera that uses the zoom lens system according to the present invention.
Figure 10:
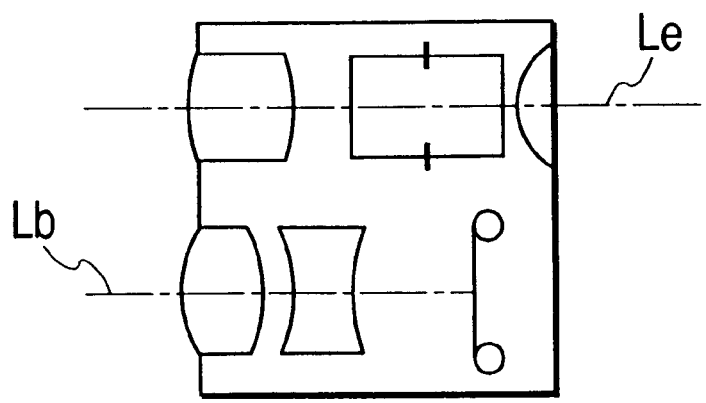
FIG. 10 is a sectional view of the camera shown in FIG. 9.

The zoom lens system according to the present invention described above is used as a photographing objective lens system for a compact camera that is configured, for example as shown in FIGS. 9 and 10. In these drawings, a reference symbols $L_b$ and $L_e$ represent a photographing optical path and a view finder optical path respectively which are arranged in parallel with each other so that an image of an object to be photographed is observed through a view finder which consists of a view finder objective lens system, an image erecting prism, a stop and an eyepiece, and imaged on a film by the photographing objective lens system.

As understood from the foregoing description, the present invention provides a compact zoom lens system that has a zooming vari-focal ratio of 2.5 or higher and nevertheless has a short total length on its collapsed condition. The zoom lens system is configured to be influenced very little due to temperature and humidity by effectively arranging lens components that use plastic materials.

What is claimed is:

1. A zoom lens system consisting, in order from the object side, of:
   a first lens unit having a positive refractive power; and
   a second lens unit having a negative refractive power; and
   configured to change a magnification from a wide position to a teleposition by moving the lens units toward the object side so as to narrow an airspace reserved between the first lens unit and the second lens unit, wherein said first lens unit consists, in order from the object side, of a first negative subunit and a second positive subunit, wherein the first negative subunit of said first lens unit comprises, in order from the object side, a biconcave lens component having a radius of curvature on the image side which is smaller than that on the object side and a negative meniscus lens component having a convex surface on the object side, wherein said second positive subunit of said first lens unit comprises a positive lens component and a negative lens component, wherein said second lens unit consists, in order from the object side, a positive lens component and a negative lens component, and wherein said zoom lens system satisfies the following conditions (1), (2) and (3):

$$0.2<|f_{G11}/D|<1.8 \quad (1)$$

$$v_{L4}<50 \quad (2)$$

$$50<v_{L5}<70 \quad (3)$$

wherein the reference symbol $f_{G11}$ represents a focal length of the first negative subunit G11 of the first lens unit G1, the reference symbol D designates a diagonal length of an image surface, the reference symbol $v_{L4}$ denotes an Abbe's number of the positive lens component L4 of the second lens unit G2 and the reference symbol $v_{L5}$ represents an Abbe's number of the negative lens component L5 of the second lens unit G2.

2. A zoom lens system consisting, in order from the object side, of a first lens unit having a positive refractive power and a second lens unit having a negative refractive power, and configured to change a magnification from a wide position to a teleposition by moving the lens units toward the object side so as to narrow an airspace reserved between the first lens unit and the second lens unit, wherein said first lens unit consists of a first negative subunit and a second positive subunit which are arranged in order from the object side, respectively, before and after a widest airspace reserved in the first lens unit, wherein the first negative subunit of said first lens unit comprises, in order from the object side, a biconcave lens component having radius of curvature on the image side which is smaller than that on the object side and a negative meniscus lens component having a convex surface on the object side, wherein the second positive subunit of said first lens unit consists of a positive lens component, wherein said second lens unit comprises, in order from the object side, a positive lens component and a negative lens component, and wherein said zoom lens system satisfies the following conditions (1), (2) and (3)

$$0.2<|f_{G11}/D|<1.8 \quad (1)$$

$$v_{L4}<50 \quad (2)$$

$$50<v_{L5}<70 \quad (3)$$

wherein the reference symbol $f_{G11}$ represents a focal length of the first negative subunit G11 of the first lens unit G1, the reference symbol D designates a diagonal length of an image surface, the reference symbol $v_{L4}$ denotes an Abbe's number of the positive lens component L4 of the second lens unit G2 and the reference symbol $v_{L5}$ represents an Abbe's number of the negative lens component L5 of the second lens unit G2.

3. A zoom lens system consisting, in order from the object side, of a first lens unit having a positive refractive power aid a second lens unit having a negative refractive power, and configured to change a magnification from a wide position to a teleposition by moving the lens units so as to narrow an airspace reserved between the first lens unit and the second lens unit, wherein said first lens unit consists in order from the object side, of a first negative subunit and a second positive subunit, wherein the first negative subunit of said first lens unit consists, in order from the object radius side, a biconcave lens component having radius of curvature on the image side which is smaller than that on the object side and a negative meniscus lens component having a convex surface on the object side, wherein the second positive subunit of said first lens unit consists of a positive lens component, wherein said second lens unit consists, in order from the object side, of a positive lens component and a negative lens component, and wherein said zoom lens system satisfies the following condition (3):

$$50<v_{L5}<70 \quad (3)$$

wherein the reference symbol $v_{L5}$ represents an Abbe's number of the negative lens component L5 of the second lens unit G2.

4. The zoom lens system according to claim 1, 2 or 3, wherein at least an aspherical surface is used as a surface of the meniscus lens component disposed in the first negative subunit of the first lens unit.

5. The zoom lens system according to claim 1, 2 or 3, wherein the negative lens component disposed in the first negative subunit of said first lens unit is made of a plastic material.

6. The zoom lens system according to claim 5 satisfying the following condition (4):

$$3.0<|f_P|/D \quad (4)$$

wherein the reference symbol $f$, represents a focal length of the lens component made of the plastic material and the reference symbol D designates a diagonal length of an image surface.

7. The zoom lens system according to claim 1, 2 or 3, wherein at least an aspherical surface is used as a surface of the positive lens component disposed in said second lens unit.

8. A zoom lens system consisting, in order from the object side, of a first lens unit having a positive refractive power, and a second lens unit having a negative refractive power, and configured to change a magnification from a wide position to a teleposition by moving the lens units toward the object side so as to narrow an airspace reserved between the first lens unit and the second lens unit, wherein said first lens unit consists, in order from the object side, of a first negative subunit and a second positive subunit wherein the first negative subunit of said first lens unit comprises, in order from the object side, a biconcave lens component having radius of curvature on the image side which is smaller than that on the object side, and a negative meniscus lens component which uses at least an aspherical surface, is made of a plastic material and has a convex surface on the object side, wherein the second positive subunit of said first lens unit comprises a positive lens component, wherein said second lens unit consists, in order from the object side, of a positive lens component which uses at least an aspherical surface and is made of a plastic material, and a negative lens component, and wherein said zoom lens system satisfies the following conditions (1) and (3):

$$0.2 < |f_{G11}/D| < 1.8 \quad (1)$$

$$50 < \nu_{L5} < 70 \quad (3)$$

wherein the reference symbol $f_{G11}$ represents a focal length of the first negative subunit G11 of the first lens unit G1, the reference symbol D designates a diagonal length or an image surface and the reference symbol $\nu_{L5}$ represents an Abbe's number of the negative lens component L5 of the second lens unit G2.

9. A zoom lens system consisting, in order from the object side, of a first lens unit having a positive refractive power and a second lens unit having a negative refractive power, and configured to change a magnification from a wide position to a teleposition by moving the lens units toward the object side so as to narrow an airspace reserved therebetween the first lens unit and the second lens unit, wherein said first lens unit consists, in order from the object side, of a first negative subunit and a second positive subunit with a wide airspace reserved therebetween, wherein the first negative subunit of said first lens unit comprises, in order from the object side, a biconcave lens component having radius of curvature on the image side which is shorter than that on the object side, and a negative meniscus lens component which uses at least an aspherical surface, is made of a plastic material, and has a convex surface on the object side, wherein the second positive subunit of said first lens unit consists of a positive lens component, wherein said second lens unit comprises, in order from the object side, a positive lens component which uses at least an aspherical surface and is made of a plastic material, and a negative lens component, and wherein said zoom lens system satisfies the following conditions (1) and (3):

$$0.2 < |f_{G11}/D| < 1.8 \quad (1)$$

$$50 < \nu_{L5} < 70 \quad (3)$$

wherein the reference symbol $f_{G11}$ represents a focal length of the first negative subunit G11 of the first lens unit G1, the reference symbol D designates a diagonal length of an image surface, and the reference symbol $\nu_{L5}$ represents an Abbe's number of the negative lens component L5 of the second lens unit G2.

10. The zoom lens system according to claim 8 or 9 satisfying the following condition (4):

$$3.0 < |f_P|/D \quad (4)$$

wherein the reference symbol $f_P$ represents a focal length of the lens component made of the plastic material and the reference symbol D designates a diagonal length of an image surface.

11. The zoom lens system according to claim 1, 2, 3, 8 or 9 having a vari-focal ratio of 1 or higher.

12. The zoom lens system according to claim 1, 2, 3, 8 or 9 having a field angle of 60° or wider at the wide position.

13. The zoom lens system according to claim 1, 2, 8 or 9 satisfying, in place of the condition (1), the following condition (1-1):

$$0.5 < |f_{G11}/D| < 1.8 \quad (1-1)$$

wherein the reference symbol fG11 represents a focal length of the first negative subunit G11 of the first lens unit G1, the reference symbol D designates a diagonal length of an image surface.

14. The zoom lens system according to claim 6 satisfying, in place of the condition (4), the following condition (4-1)

$$5.5 < |f_P|/D \quad (4-1)$$

wherein the reference symbol $f_P$ represents a focal length of the lens component made of the plastic material and the reference symbol D designates a diagonal length of an image surface.

15. The zoom lens system according to claim 10 satisfying, in place of the condition (4), the following condition (4-1):

$$5.5 < |f_P|/D \quad (4-1)$$

wherein the reference symbol $f_P$ represents a focal length of the lens component made of the plastic material and the reference symbol D designates a diagonal length of an image surface.

16. The zoom lens system according to claim 3 satisfying at least any one of the following conditions (1) and (2):

$$0.2 < |f_{G11}/D| < 1.8 \quad (1)$$

$$\nu_{L4} < 50 \quad (2)$$

wherein the reference symbol $f_{G11}$ represents a focal length of the first negative subunit G11 of the first lens unit G1, the reference symbol D designates a diagonal length of an image surface, and the reference symbol $\nu_{L4}$ denotes an Abbe's number of the positive lens component L4 of the second lens unit G2.

17. A camera comprising the zoom lens system according to claim 1, 2, 3, 8 or 9.

18. A zoom lens system consisting, in order from the object side, of a first lens unit having a positive refractive power, and a second lens unit having a negative refractive power, and configured to change a magnification from a wide position to a teleposition by moving the lens units toward the object side so as to narrow an airspace reserved between the first lens unit and the second lens unit, wherein said first lens unit consists, in order from the object side, of a first negative subunit and a second positive subunit, wherein the first negative subunit disposed in said first lens unit consists of a negative lens element having a radius of curvature on the image side which is smaller than that on the object side, wherein the second positive subunit disposed in said first lens unit consists of a negative lens element and a positive lens element, wherein said second lens unit comprise at least a positive lens element and a negative lens element, and wherein said zoom lens system satisfies the following conditions (5) and (6):

$$0.2 < |f_{1N}/D| < 2.1 \quad (5)$$

$$5 < \nu_d(R) - \nu_d(F) < 20 \quad (6)$$

wherein the reference symbol $f_{1N}$ represents a focal length of the respective negative lens elements disposed in the first lens unit, the reference symbol D designates a diagonal length of an image surface, the reference symbol $\nu_d(R)$ denotes an Abbe's number of the negative lens element disposed on the image side, and the reference symbol $\nu_d(F)$ represents an Abbe's number of the negative lens element disposed on the object side.

19. The zoom lens system according to claim 18, wherein all the lens elements are made of a glass material.

20. The zoom lens system according to claim 18, said negative lens element and said positive lens element of said positive subunit are cemented to each other.

21. A zoom lens system consisting, in order from the object side, of a first lens unit having a positive refractive power, and a second lens unit having a negative refractive power, and configured to change a magnification from a wide position to a teleposition by moving the lens units so as to narrow an airspace reserved between the first lens unit and the second lens unit, wherein said first lens unit consists, in order from the object aide, of a first negative subunit and a second positive subunit, wherein the first negative subunit disposed in said first lens unit consists of a negative lens element having a radius of curvature on the image side which is smaller than that on the object side, wherein the second positive subunit disposed in said first lens unit comprising at least a negative lens element and at least a positive lens element, wherein said second lens unit comprises at least a positive lens element and at least negative lens element, and wherein said zoom lens system satisfies the following conditions (5) and (6) and (7):

$$0.2<|f_{IN}/D|<2.1 \qquad (5)$$

$$5<v_d(R)-v_d(F)<20 \qquad (6)$$

$$-5.0<(R2+R1)/(R2-R1)<-0.9 \qquad (7)$$

wherein the reference symbol $f_{IN}$ represents a focal length of the respective negative lens elements disposed in the first lens unit, the reference symbol D designates a diagonal length of the photographing screen, the reference symbol $v_d(R)$ denotes an Abbe's number of the negative lens element disposed on the image side, the reference symbol $v, (F)$ represents an Abbe's number of the negative lens element disposed on the object side, the reference symbol $R_1$ designates a radius of curvature on an object side surface of the negative lens element of the first negative subunit disposed in the first lens unit and the reference symbol $R_2$ denotes a radius of curvature on an image side surface of the negative lens element of the first negative subunit disposed in the first lens unit.

22. The zoom lens system according to claim 18, 19, 20 or 21, wherein at least an aspherical surface is used as a surface of the first negative subunit disposed in said first lens unit.

23. The zoom lens system according to claim 18, 19, 20 or 21, wherein at least one of the negative lens element disposed in said first lens unit has an aspherical layer which is formed by coating a transparent resin and drying it.

24. The zoom lens system according to claim 23 further satisfying the following condition (9):

$$2.0<|f_H|/D \qquad (9)$$

wherein the reference symbol $f_H$ represents a paraxial focal length of the resin layer and the reference symbol D designates a diagonal length of an image surface.

25. A zoom lens system consisting, in order from the object side, of a first lens unit having a positive refractive power and a second lens unit having a negative refractive power, and configured to change a magnification from a wide position to a teleposition by moving the lens units so as to narrow an airspace reserved between the first lens unit and the second lens unit, wherein said first lens unit consists, in order from the object side, of a first negative subunit and a second positive subunit, wherein the first negative subunit disposed in said first lens unit consists, in order from the object side, of a negative lens element having a radius of curvature on the object side which is smaller than that on the image side, and a meniscus lens element having a convex surface on the object side, wherein the second positive subunit disposed in said first lens unit comprises at least a negative lens element and at least a positive lens element, wherein said second lens unit comprises at least a positive lens element and at least a negative lens element, and wherein said zoom lens system satisfies the following conditions (8) and (6):

$$0.2<|f_{IF}/D|<2.1 \qquad (8)$$

$$5<v_d(R)-v_d(F)<20 \qquad (6)$$

wherein the reference symbol $f_{IF}$ represents a focal length of the first negative subunit elements disposed in said first lens unit, the reference symbol D designates a diagonal length of an image surface, the reference symbol $v_d(R)$ denotes an Abbe's number of the negative lens element disposed on the image side, and the reference symbol $v_d(F)$ represents an Abbe's number of the negative lens element disposed on the object side.

26. The zoom lens system according to claim 18, 21 or 25, wherein at least an aspherical surface is used in said second lens unit.

27. The zoom lens system according to claim 18, 21 or 25, wherein at least one of surfaces of said second lens unit has an aspherical layer which is formed by coating a transparent resin and drying it.

28. A zoom lens system consisting, in order from the object side, of a first lens unit having a positive refractive power and a second lens unit having a negative refractive power, and configured to change a magnification from a wide position to a tele position by moving the lens units toward the object side so as to narrow an airspace reserved between the first lens unit and the second lens unit, wherein said first lens unit comprises at least a negative lens element and at least a positive lens element, wherein said second lens unit comprises at least a negative lens element and at least a positive lens element, and wherein at least a surface of the negative lens element disposed in said first lens unit has an aspherical layer which is formed by coating a transparent resin and hardening it.

29. The zoom lens system according to claim 28, wherein an aspherical surface is used on a surface of at least one negative lens element disposed in said first lens unit.

30. The zoom lens system according to claim 18, 21, 25 or 28 having a van-focal ratio of 2.5 or higher.

31. A camera comprising the zoom lens system according to claim 18, 21, 25 or 28.

* * * * *